US012606726B2

(12) United States Patent
Mizuno et al.

(10) Patent No.: US 12,606,726 B2
(45) Date of Patent: Apr. 21, 2026

(54) ADHESIVE LAYER, LAMINATE, OPTICAL LAMINATE, METHOD FOR PRODUCING OPTICAL LAMINATE, AND OPTICAL DEVICE

(71) Applicant: NITTO DENKO CORPORATION, Osaka (JP)

(72) Inventors: Mizuho Mizuno, Osaka (JP); Akiko Tanaka, Osaka (JP); Naofumi Kosaka, Osaka (JP); Kozo Nakamura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 531 days.

(21) Appl. No.: 17/800,727

(22) PCT Filed: Feb. 19, 2021

(86) PCT No.: PCT/JP2021/006452
§ 371 (c)(1),
(2) Date: Aug. 18, 2022

(87) PCT Pub. No.: WO2021/167090
PCT Pub. Date: Aug. 26, 2021

(65) Prior Publication Data
US 2023/0102613 A1      Mar. 30, 2023

(30) Foreign Application Priority Data
Feb. 21, 2020      (JP) ................................. 2020-028232

(51) Int. Cl.
*C09J 133/08*          (2006.01)
*C09J 133/12*          (2006.01)

(52) U.S. Cl.
CPC ........... *C09J 133/12* (2013.01); *C09J 133/08* (2013.01); *C09J 2301/312* (2020.08); *C09J 2301/414* (2020.08); *Y10T 428/2891* (2015.01)

(58) Field of Classification Search
None
See application file for complete search history.

(56) References Cited

U.S. PATENT DOCUMENTS

2013/0003389 A1      1/2013  Moroishi et al.
2014/0248489 A1*     9/2014  Higashi ..................... B32B 7/12
                                                              524/548

2015/0291858 A1*    10/2015  Nishimura .............. C08L 33/06
                                                              428/344
2021/0109274 A1      4/2021  Rinko et al.
2021/0363391 A1     11/2021  Kimura et al.
2023/0110868 A1*     4/2023  Mizuno ...................... C09J 7/10
                                                              156/332
2024/0061157 A1*     2/2024  Tanaka .................... B32B 27/36

FOREIGN PATENT DOCUMENTS

| CN | 102533205 A | 7/2012 |
|---|---|---|
| JP | 2005-112966 A | 4/2005 |
| JP | 2011-026361 A | 2/2011 |
| JP | 2011-215601 A | 10/2011 |
| JP | 2012-007046 A | 1/2012 |
| JP | 2012-008277 A | 1/2012 |
| JP | 2016-221925 A | 12/2016 |
| TW | 201235433 A1 | 9/2012 |
| TW | 201842129 A | 12/2018 |
| TW | 201920566 A | 6/2019 |
| WO | 2011-105217 A1 | 9/2011 |
| WO | 2019/087118 A1 | 5/2019 |
| WO | 2019/182091 A1 | 9/2019 |

OTHER PUBLICATIONS

Machine translation of JP-WO2011105217 A1, Jun. 20, 2013 (Year: 2013).*
Office Action that issued in corresponding Japanese Patent Application No. 2022-501090, dated Feb. 20, 2024, along with English translation thereof.
International Search Report and Written Opinion of the International Searching Authority Application No. PCT/JP2021/006452, dated May 11, 2021, English translation.
Extended European Search Report that issued in corresponding European Patent Application No. 21757226.2, dated Feb. 15, 2024.
Office Action and Search Report that issued in Chinese Patent Application No. 2021180015744.9, dated Mar. 16, 2024, along with English translation thereof.
Office Action and Search Report that issued in corresponding Taiwanese Patent Application No. 110105826, dated Nov. 15, 2024, along with English translations thereof.
Office Action that issued in corresponding Korean Patent Appl. No. 10-2022-7028610, dated May 20, 2025, along with English translation thereof.

* cited by examiner

*Primary Examiner* — Anish P Desai
(74) *Attorney, Agent, or Firm* — Greenblum & Bernstein, P.L.C.

(57) ABSTRACT

An adhesive layer (20a) has a creep deformation rate when a stress of 10000 Pa is applied at 50° C. for 1 second is 10% or less, and a creep deformation rate when a stress of 10000 Pa is applied at 50° C. for 30 minutes is 16% or less, in a creep test using a rotational rheometer, and has a 180° peel adhesive strength of 10 mN/20 mm or more with respect to a PMMA film.

26 Claims, 3 Drawing Sheets

ADHESIVE LAYER, LAMINATE, OPTICAL LAMINATE, METHOD FOR PRODUCING OPTICAL LAMINATE, AND OPTICAL DEVICE

TECHNICAL FIELD

The present invention relates to: an adhesive layer; a multilayered body including an adhesive layer; a multilayered body including an adhesive composition layer for composing an adhesive layer; an optical stack including an adhesive layer and an optical sheet, and a production method for the optical stack; and an optical device including such an optical stack.

BACKGROUND ART

Optical sheets (e.g., microlens sheets, prism sheets, brightness enhancement films (e.g., Brightness Enhancement Film: BEF (registered trademark) manufactured by 3M) are used in various optical devices (e.g., display devices and illumination devices). In the present specification, "optical sheet" is not limited to those illustrated above, but broadly includes sheet-shaped optical components, and further includes, for example, diffusion plates and light guide plates. An optical device is attached to another optical sheet or an optical device by using an adhesive layer, for example. In the present specification, "optical stack" refers to a configuration including an optical sheet and an adhesive layer or including a plurality of optical sheets. In the present specification, "adhesive" is meant to encompass tackiness agents (also referred to as "pressure-sensitive adhesives").

The applicant has disclosed an optical stack (referred to as "optical sheet" in Patent Document 1) that can be used for display devices and illumination devices in Patent Document 1. The optical stack in Patent Document 1 has an optical sheet (e.g., microlens sheet) having a concavo-convex structure on its surface and an adhesive layer provided on the surface having the concavo-convex structure. The adhesive layer fills 5% to 90% of the convex height of the concavo-convex structure. The adhesive layer is formed from an adhesive composition containing a graft polymer, which is a (meth)acrylic polymer grafted with chains containing monomers containing cyclic ether groups, and a cationic photopolymerization initiator or heat-curing catalyst.

CITATION LIST

Patent Literature

[Patent Document 1] Japanese Laid-Open Patent Publication No. 2012-007046 (Japanese Patent No. 5658490)
[Patent Document 2] International Publication No. WO 2019/087118 A1

SUMMARY OF INVENTION

Technical Problem

When attaching an optical sheet having a concavo-convex structure on its surface by using an adhesive layer, the degree to which the adhesive layer penetrates into (fills in) the dents of the concavo-convex structure affects the functionality of the optical sheet. Therefore, it is preferable that the degree to which the adhesive layer penetrates into the dents of the concavo-convex structure does not change over time.

It is preferable that, from the standpoint of mass producibility, optical stacks composed of an optical sheet and an adhesive layer or a plurality of optical sheets stacked together, which are used in optical devices, can be manufactured in roll-to-roll fashion.

The present invention was made in order to solve at least one of the above-mentioned problems, and an objective thereof is to provide: an adhesive layer such that the degree to which the adhesive layer penetrates into dents of the concavo-convex structure of an optical sheet has suppressed change over time; a multilayered body having such an adhesive layer; a multilayered body having an adhesive composition layer capable of forming such an adhesive layer; an optical stack or an optical stack capable of being produced in roll-to-roll fashion that includes such an adhesive layer and an optical sheet; and a production method for such an optical stack. It is also an objective of the present invention to provide an optical device including such an optical stack.

Solution to Problem

According to embodiments of the present invention, means for solution as recited in the following Items are provided.

[Item 1]

An adhesive layer having a creep deformation rate of 10% or less when a stress of 10000 Pa is applied at 50° C. for 1 second, and a creep deformation rate of 16% or less when a stress of 10000 Pa is applied at 50° C. for 30 minutes, in a creep test using a rotational rheometer, and having a 180° peel adhesive strength of 10 mN/20 mm or more with respect to a PMMA film.

[Item 2]

The adhesive layer of Item 1, having a haze of 0.01% or more and yet 5% or less.

[Item 3]

The adhesive layer of Item 1 or 2, having a thickness of 0.1 μm or more and yet 20 μm or less.

The thickness is preferably 15 μm or less, or 10 μm or less.

[Item 4]

The adhesive layer of any one of Items 1 to 3, comprising at least one of polymers (1) to (3):

(1) a copolymer of a nitrogen-containing (meth)acrylic monomer and at least one other kind of monomer;

(2) a copolymer of a carboxyl group-containing acrylic monomer and at least one other kind of monomer (except for nitrogen-containing (meth)acrylic monomers); and (3) a polyester-based polymer.

[Item 5]

The adhesive layer of any one of Items 1 to 4, comprising a polyester-based polymer.

[Item 6]

The adhesive layer of any of Items 1 to 5, comprising a (meth)acrylic polymer, wherein the (meth)acrylic polymer is a copolymer of a nitrogen-containing (meth)acrylic monomer and at least one other kind of monomer.

[Item 7]

The adhesive layer of Item 6, wherein the nitrogen-containing (meth)acrylic monomer has a nitrogen-containing cyclic structure.

[Item 8]

The adhesive layer of Item 6 or 7, wherein the (meth)acrylic polymer is cross-linked.

[Item 9]

The adhesive layer of any one of Items 6 to 8, not comprising a graft polymer.

[Item 10]

The adhesive layer of any of Items 6 to 9, further comprising a cured material of an active energy ray-curable resin.

[Item 11]

The adhesive layer of Item 10, formed by curing the active energy ray-curable resin in an adhesive composition layer comprising the (meth)acrylic polymer, the active energy ray-curable resin, and a polymerization initiator.

[Item 12]

A multilayered body comprising:

the adhesive layer of any one of Items 1 to 10; and a substrate having a release-treated principal face, wherein the release-treated principal face of the substrate is attached onto the adhesive layer.

The multilayered body recited in Item 12 may be referred to as an "adhesive sheet".

The multilayered body recited in Item 12 may, for example, further comprise another substrate being disposed on an opposite side of the adhesive layer from the substrate, the substrate having a release-treated principal face. In this case, the release-treated principal face of the other substrate is attached onto the adhesive layer.

The release-treated face (release-treated surface) refers to a surface that has been treated with a release agent. The release-treated principal face of the substrate (supporting body) is formed by applying (introducing) a release agent on one of the principal faces of the substrate, and further drying it, etc., as necessary. Although not particularly limited, examples of the release agent are silicone-based release agents, fluorine-based release agent, long-chain alkyl-based release agents, and fatty acid amide-based release agents.

[Item 13]

A multilayered body comprising:

the adhesive composition layer from which to form the adhesive layer of Item 11; and a substrate having a release-treated principal face, wherein the release-treated principal face of the substrate is attached onto the adhesive composition layer.

The multilayered body recited in Item 13 may be referred to as an "adhesive sheet".

The multilayered body recited in Item 13 may, for example, further comprise another substrate being disposed on an opposite side of the adhesive composition layer from the substrate, the substrate having a release-treated principal face. In this case, the release-treated principal face of the other substrate is attached onto the adhesive composition layer.

[Item 14]

An optical stack comprising:

a first optical sheet that includes a first principal face having a concavo-convex structure and a second principal face being opposite to the first principal face; and the adhesive layer of any of Items 1 to 11 disposed on the first principal face of the first optical sheet.

[Item 15]

The optical stack of Item 14, wherein the concavo-convex structure includes a plurality of dents, and a surface of the adhesive layer and the first principal face of the first optical sheet define a plurality of spaces within the plurality of dents.

[Item 16]

The optical stack of Item 15, wherein the concavo-convex structure includes a flat portion that is in contact with the adhesive layer.

[Item 17]

A production method for the optical stack of any one of Items 14 to 16, the production method comprising a step of attaching the first optical sheet and the adhesive layer together.

[Item 18]

The production method of Item 17, wherein the step is performed by roll-to-roll method.

[Item 19]

The optical stack of any one of Items 14 to 16, further comprising a second optical sheet disposed on an opposite side of the adhesive layer from the first optical sheet.

[Item 20]

A production method for the optical stack of Item 19, the production method comprising:

a step A1 of attaching together: a first multilayered body in which the first optical sheet and the adhesive layer are stacked; and the second optical sheet, or a step A2 of attaching together: a second multilayered body in which the adhesive layer and the second optical sheet are stacked; and the first optical sheet.

[Item 21]

The production method of Item 20, wherein: the production method comprises the step A1, the step A1 comprising a step of attaching together the first multilayered body and the second optical sheet by roll-to-roll method; or the production method comprises the step A2, the step A2 comprising a step of attaching together the second multilayered body and the first optical sheet by roll-to-roll method.

[Item 22]

An optical device comprising the optical stack of any one of Items 14 to 16 and 19.

[Item 23]

A production method for the optical stack of any one of Items 14 to 16 as directly or indirectly depending from Item 11, the production method comprising:

a step A of applying the adhesive composition layer onto the first principal face of the first optical sheet; and a step B of, with the adhesive composition layer being applied on the first principal face of the first optical sheet, curing the active energy ray-curable resin in the adhesive composition layer.

[Item 24]

The production method of Item 23, wherein the step A comprises a step of attaching together the first optical sheet and the adhesive composition layer by roll-to-roll method.

[Item 25]

A production method the optical stack of Item 19 as indirectly depending from Item 11, the production method comprising:

either one of a step A1 of attaching together: a first multilayered body in which the first optical sheet and the adhesive composition layer are stacked; and the second optical sheet, or a step A2 of attaching together: a second multilayered body in which the adhesive composition layer and the second optical sheet are stacked; and the first optical sheet; and a step B of, after the step A1 or the step A2, curing the active energy ray-curable resin comprised in the adhesive composition layer.

[Item 26]

The production method of Item 25, wherein: the production method comprises the step A1, the step A1 comprising a step of attaching together the first multilayered body and the second optical sheet by roll-to-roll method; or the production method comprises the step A2, the step A2 comprising a step of attaching together the second multilayered body and the first optical sheet by roll-to-roll method.

Advantageous Effects of Invention

According to an embodiment of the present invention, there is provided: an adhesive layer such that the degree to which the adhesive layer penetrates (fills) into dents of the concavo-convex structure of an optical sheet has suppressed change over time; a multilayered body having such an adhesive layer; a multilayered body having an adhesive composition layer capable of forming such an adhesive layer; an optical stack or an optical stack capable of being produced in roll-to-roll fashion that includes such an adhesive layer and an optical sheet; and a production method for such an optical stack. According to another embodiment of the present invention, there is provided an optical device including such an optical stack.

DESCRIPTION OF EMBODIMENTS

First, an adhesive layer, a multilayered body including an adhesive layer, a multilayered body including an adhesive composition layer for composing an adhesive layer, and an optical stack including an adhesive layer and an optical sheet, and a production method for the optical stack according to an embodiment of the present invention will be described.

Figure 1:
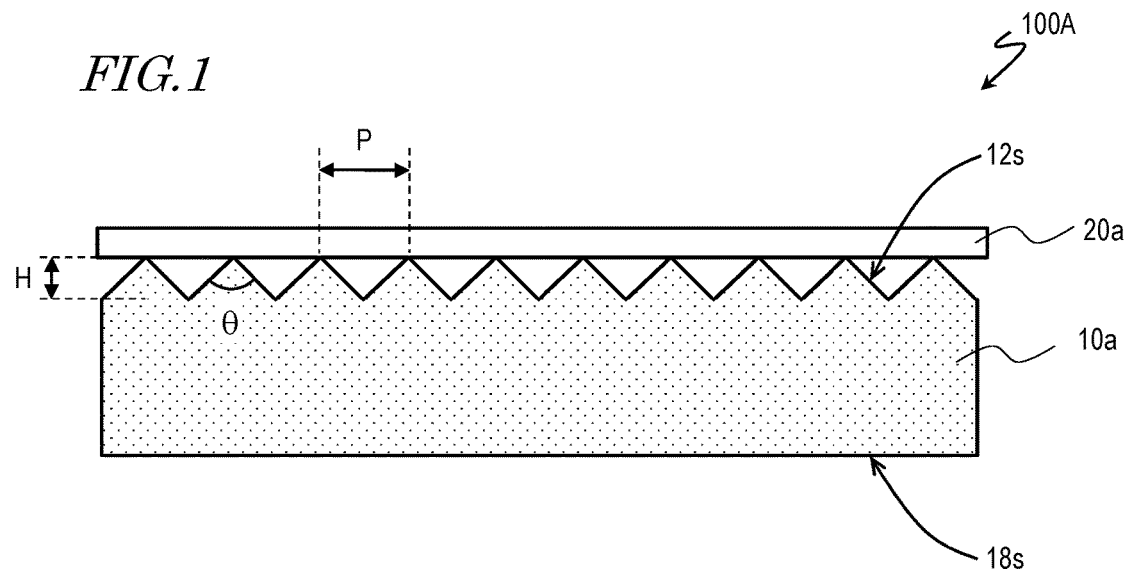
FIG. 1 A schematic cross-sectional view of an optical stack 100A according to an embodiment of the present invention.
Figure 2:
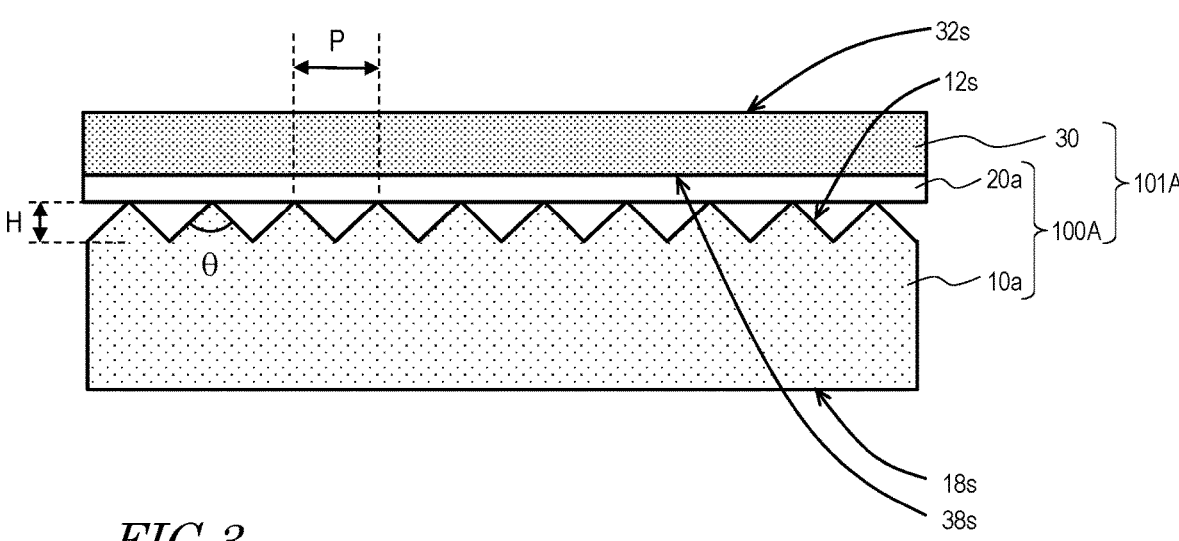
FIG. 2 A schematic cross-sectional view of an optical stack 101A according to another embodiment of the present invention.

FIG. 1 and FIG. 2 show schematic cross-sectional views of optical stacks 100A and 101A according to an embodiment of the present invention, respectively. As shown in FIG. 1, the optical stack 100A includes an adhesive layer 20a on a concavo-convex structure of a prism surface (first principal face) 12s of a prism sheet (first optical sheet) 10a. Instead of the prism sheet 10a, other optical sheets (e.g., microlens sheets) may be used. As shown in FIG. 2, the optical stack 101A includes the optical stack 100A and a second optical sheet 30 disposed on an opposite side of the adhesive layer 20a from the first optical sheet 10a. The description concerning the optical stack 100A also applies to the optical stack 101A unless otherwise specified, and therefore may be omitted in order to avoid redundancy.

During the production step of the optical stack 100A (or the optical stack 101A), when the adhesive layer 20a is attached to the prism sheet 10a by e.g. a roll-to-roll method, it is required that the adhesive layer 20a does not penetrate too much into the dents of the concavo-convex structure of the prism sheet 10a. Moreover, after the adhesive layer 20a is attached to the prism sheet 10a, it is required that the degree to which the adhesive layer 20a penetrates into the dents is unlikely to change over time.

The inventors have found that there is a correlation between the creep deformation rate of the adhesive layer 20a and the degree of penetration of the adhesive layer 20a when it is attached to the prism sheet 10a and the change over time in the degree of penetration, and that the creep deformation rate can be used to select a suitable adhesive layer.

Figure 3:
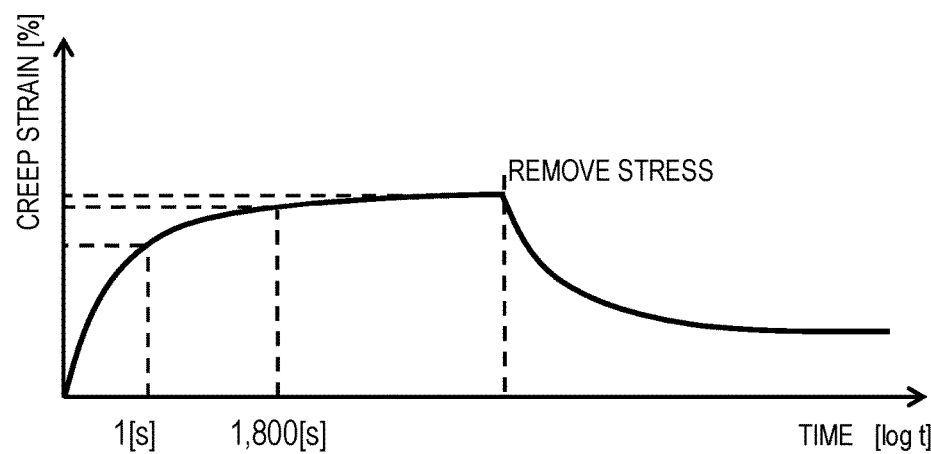
FIG. 3 A schematic diagram showing a creep curve of an adhesive.

In general, when a constant stress is acting on a viscoelastic polymeric substance, a phenomenon (creep) occurs in which the strain (deformation rate) increases with time, as represented by the creep curve shown in FIG. 3. The strain of a viscoelastic body when a constant stress is applied includes: an elastic component that occurs instantaneously with the application of stress; a viscoelastic component that is expressed as an increasing function of time and reaches a constant value after a long period of time; and a viscous component that increases proportionally with time. Due to the viscous component, the strain continues to increase at a constant rate after a long period of time. After the stress is removed, the viscous component of strain remains without recovery.

The degree to which the adhesive layer 20a penetrates into the dents when attaching the adhesive layer 20a is correlated with the creep strain of the adhesive layer 20a after 1 second (referred to "creep deformation rate A"). In other words, the degree to which the adhesive layer 20a penetrates into the dents when attaching the adhesive layer 20a is mainly affected by the elastic component of the adhesive layer 20a. On the other hand, the change over time in the degree of penetration of the adhesive layer 20a into the dents is correlated with the creep strain of the adhesive layer 20a after 30 minutes (1800 seconds) (referred to "creep deformation rate B"). In other words, the change over time in the degree of penetration of the adhesive layer 20a into the dents is mainly affected by the viscoelastic component and viscous component of the adhesive layer 20a. Note that the degree of penetration of the adhesive layer 20a into the dents can be evaluated by the diffuse transmittance of the optical stack 100A. The greater the degree to which the adhesive layer 20a penetrates into the dents of the prism sheet 10a, the smaller the diffuse transmittance. Creep deformation has two stages: a transition creep (primary creep), which is the initial stage of deformation where the strain rate (slope of the creep curve) gradually decreases; and a steady-state creep (secondary creep), where the strain rate becomes essentially constant. As shown in FIG. 3, 30 minutes (1800 seconds) after pressure application is a point in time belonging in the steady-state creep region after the transition creep.

As will be explained later with respect to experimental examples, the adhesive layer 20a of the optical stack 100A according to an embodiment of the present invention has a creep deformation rate A of 10% or less when a stress of 10000 Pa is applied for 1 second at 50° C. in a creep test using a rotational rheometer, and has a creep deformation rate B of 16% or less when a stress of 10000 Pa is applied for 30 minutes at 50° C. in a creep test using a rotational rheometer. In the experimental examples, the evaluation results of diffuse transmittance of the optical stack are also shown. The creep deformation rates A and B of the adhesive layer and the diffuse transmittance of the optical stack can be measured, for example by a method which is described in the experimental examples below.

As for the adhesive layer 20a having a creep deformation rate A of 10% or less, the degree to which the adhesive layer 20a penetrates into the dents is reduced to be sufficiently small when attached. As for the adhesive layer 20a having a creep deformation rate B of 16% or less, the change over time in the degree of penetration into the dents is sufficiently suppressed. The creep deformation rate A of the adhesive layer 20a is e.g. 10% or less, 9% or less, 8% or less, 7% or less, 6% or less, or 5% or less, and the creep deformation rate B of the adhesive layer 20a is e.g. 16% or less, 15% or less, 14% or less, 13% or less, 12% or less, 11% or less, or 10% or less. The lower limits of the creep deformation rates A and B are not particularly limited, but may be greater than 0, for example. More preferably, the adhesive layer 20a has a creep deformation rate A of 8% or less and a creep deformation rate B of 14% or less, and still more preferably a creep deformation rate A of 5% or less and a creep deformation rate B of 10% or less.

The second optical sheet 30 has a principal face 38s on the adhesive layer 20a side and a principal face 32s on the opposite side of the principal face 38s. The principal face 38s is a flat surface. Depending on the purpose, any suitable material may be adopted for the second optical sheet 30. The material of the second optical sheet 30 may for example be a light-transmitting thermoplastic resin, and more specifically a film made of a (meth)acrylic resin such as polymethyl methacrylate (PMMA), or a polycarbonate (PC)-based resin or the like. At least one other optical component (or an optical sheet) may be disposed on the opposite side of the second optical sheet 30 of the optical stack 101A from the adhesive layer 20a (i.e., on the principal face 32s). The other optical component (optical sheet) includes e.g. a diffusion plate, a light guide plate, or the like, and is adhesively bonded onto the principal face 32s of the optical sheet 30 via an adhesive layer. In other words, an optical stack according to another embodiment of the present invention includes an optical stack 101A and at least one other optical sheet disposed on the opposite side of the second optical sheet 30 of the optical stack 101A from the adhesive layer 20a. An optical device according to another embodiment of the present invention includes an optical stack 101A and another optical component disposed on the opposite side of the second optical sheet 30 of the optical stack 101A from the adhesive layer 20a.

The adhesive layer 20a has a 180° peel adhesive strength with respect to a PMMA film of e.g. 10 mN/20 mm or more. Although not particularly limited, its upper limit may be e.g. 50 N/20 mm or less, 40 N/20 mm or less, 30 N/20 mm or less, 20 N/20 mm or less, 10 N/20 mm or less, or 1 N/20 mm or less. The adhesive layer 20a has a haze of e.g. 0.01% or more, and yet 5% or less, 4% or less, 3% or less, 2% or less, or 1.5% or less. The thickness of the adhesive layer 20a is e.g. 0.1 μm or more, 0.5 μm or more, or 1.0 μm or more, and yet 20 μm or less, 15 μm or less, 10 μm or less, or 5 μm or less. The adhesive layer 20a is used to attach the optical stack 100A to another optical sheet or an optical device. Note that the 180° peel adhesive strength with respect to a PMMA film of the adhesive layer and the haze of the adhesive layer can be measured by a method described in the experimental examples below, for example.

The following adhesives may suitably used for the adhesive forming the adhesive layer 20a, as will be described later with respect to experimental examples.

The adhesive contains a (meth)acrylic polymer, for example, where the (meth)acrylic polymer is a copolymer of a nitrogen-containing (meth)acrylic monomer and at least one other kind of monomer, for example. The nitrogen-containing (meth)acrylic monomer has a nitrogen-containing cyclic structure, for example. When a (meth)acrylic polymer is prepared by using a nitrogen-containing (meth) acrylic monomer, an effect of improving the elastic property of the (meth)acrylic polymer is obtained especially when the nitrogen-containing (meth)acrylic monomer has a nitrogen-containing cyclic structure.

In the case where the adhesive contains a (meth)acrylic polymer, the (meth)acrylic polymer is preferably cross-linked. In the case where the adhesive contains a (meth) acrylic polymer, the adhesive may further include an active energy ray-curable resin (e.g. a UV-curable resin) and a curing agent (e.g. a photopolymerization initiator), or may further contain a cured material of an active energy ray-curable resin. The active energy rays may be visible light and ultraviolet, for example. By introducing a cross-linked structure into the adhesive, deformation of the adhesive during attachment and its deformation over time are suppressed. In particular, by curing the active energy ray-curable resin after applying the adhesive composition layer (which becomes the adhesive layer 20a) to the optical sheet 10a, deformation of the adhesive layer 20a over time can be suppressed, and the change over time in the degree to which the adhesive layer 20a penetrates into the dents can be suppressed. When the active energy ray-curable resin is cured, the adhesive layer 20a becomes hard. If the adhesive layer 20a is too hard, it may be difficult to attach the adhesive layer 20a to the optical sheet 10a by a roll-to-roll method. However, this problem can be avoided if the active energy ray-curable resin is cured after the adhesive composition layer is applied to the optical sheet 10a.

An adhesive layer 20a containing a cured material of an active energy ray-curable resin is formed by the following method, for example. First, an adhesive composition solution layer is formed from an adhesive composition solution containing a (meth)acrylic polymer, a cross-linking agent, an active energy ray-curable resin, a polymerization initiator, and a solvent. The adhesive composition solution layer is formed, for example, on a release-treated principal face of a substrate. The solvent in the adhesive composition solution layer is then removed and the (meth)acrylic polymer in the adhesive composition solution layer is cross-linked with the cross-linking agent (e.g., by heating) to obtain an adhesive composition layer having a cross-linked structure. When the adhesive composition solution layer is formed on the release-treated principal face of the substrate, the adhesive composition layer becomes formed on the release-treated principal face of the substrate, whereby a multilayered body having the substrate and the adhesive composition layer is obtained. Now, the cross-linked structure that is formed of the (meth)acrylic polymer and the cross-linking agent will be referred to as the first cross-linked structure. This is to be distinguished from the cross-linked structure formed by curing the active energy ray-curable resin (second cross-linked structure), which will be described later. The polymer in the adhesive composition solution layer may be cross-linked in the step of removing the solvent in the adhesive composition solution layer; or, a further step of cross-linking the polymer in the adhesive composition solution layer may be performed after and separately from the step of removing the solvent in the adhesive composition solution layer. Thereafter, the adhesive composition layer is attached onto the first principal face 12s of the optical sheet 10a, and with the adhesive composition layer placed on the first principal face 12s of the optical sheet 10a, the adhesive composition layer is irradiated with active energy rays to cure the active energy ray-curable resin, whereby the adhesive layer 20a having the second cross-linked structure in addition to the first cross-linked structure can be formed. The first cross-linked structure and the second cross-linked structure possessed by the adhesive layer 20a can be considered as forming a so-called interpenetrating polymer network structure (IPN).

An adhesive layer 20a that does not contain a cured material of an active energy ray-curable resin is formed by the following method, for example. First, an adhesive composition solution layer is formed from an adhesive composition solution containing a polymer, a cross-linking agent and a solvent. This adhesive composition solution contains neither an active energy ray-curable resin nor a polymerization initiator. The adhesive composition solution layer is formed, for example, on the release-treated principal face of the substrate. The solvent in the adhesive composition solution layer is then removed and the polymer in the adhesive composition solution layer is cross-linked with a cross-linking agent (e.g., by heating) to obtain an adhesive layer 20a having a cross-linked structure. When the adhesive composition solution layer is formed on the release-treated principal face of the substrate, the adhesive layer becomes formed on the release-treated principal face of the substrate, whereby a multilayered body having a substrate and an adhesive layer is obtained. The polymer in the adhesive composition solution layer may be cross-linked in the step of removing the solvent in the adhesive composition solution layer; or, a further step of cross-linking the polymer in the adhesive composition solution layer may be performed after and separately from the step of removing the solvent in the adhesive composition solution layer.

Preferably, the adhesives does not contain any graft polymer. When formed from an adhesive composition containing graft polymers, as in the adhesive layer described in Patent Document 1, there are many design and control factors for the material, which may result in less mass producibility. Adhesives containing no graft polymer can have their creep characteristics adjusted by various factors (e.g., type and amount of cross-linking agent, type and amount of active ray-curable resin).

Suitable specific examples of the adhesive are described below.

The adhesive includes a (meth)acrylic polymer, for example. Without particular limitation, any (meth)acrylate can be used as a monomer for producing the (meth)acrylic polymer. For example, an alkyl(meth)acrylate having an alkyl group with 4 or more carbon atoms can be used. In this case, the ratio of the alkyl(meth)acrylate having an alkyl group with 4 or more carbon atoms to the total amount of monomer used in the production of the (meth)acrylic polymer is, for example, 50 mass % or more.

In the present specification, "alkyl (meth)acrylate" refers to any (meth)acrylate having straight or branched-chain alkyl groups. The number of carbon atoms in the alkyl group possessed by the alkyl (meth)acrylate is preferably 4 or more, and more preferably 4 or more and yet 9 or less. Note that (meth)acrylate refers to acrylates and/or methacrylates.

Specific examples of alkyl (meth)acrylates include n-butyl (meth)acrylate, sec-butyl (meth)acrylate, tert-butyl (meth)acrylate, isobutyl (meth)acrylate, n-pentyl (meth) acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, isomyristyl (meth)acrylate, n-tridecyl (meth)acrylate, n-tetradecyl (meth)acrylate, stearyl (meth) acrylate, isostearyl (meth)acrylate, and the like. These can be used alone or in combination.

The adhesive may include a (meth)acrylic polymer that is a copolymer of a nitrogen-containing (meth)acrylic monomer and at least one other kind of monomer. In this case, the (meth)acrylic polymer is preferably a copolymer obtained by copolymerizing the following monomers in the following amounts, when the total amount of monomers used for copolymerization is 100 mass parts.

Nitrogen-containing (meth)acrylic monomer: 10.0 mass parts or more, 15.0 mass parts or more, 20.0 mass parts or more, 25.0 mass parts or more, 30.0 mass parts or more, or 35.0 mass parts or more, and yet 40.0 mass parts or less, 35.0 mass parts or less, 30.0 mass parts or less, 25.0 mass parts or less, 20.0 mass parts or less, or 15.0 mass parts or less. For example, 10.0 mass parts or more and yet 40.0 mass parts or less.

Hydroxyl group-containing acrylic monomer: 0.05 mass parts or more, 0.75 mass parts or more, 1.0 mass part or more, 2.0 mass parts or more, 3.0 mass parts or more, 4.0 mass parts or more, 5.0 mass parts or more, 6.0 mass parts or more, 7.0 mass parts or more, 8.0 mass parts or more, or 9.0 mass parts or more, and yet 10.0 mass parts or less, 9.0 mass parts or less, 8.0 mass parts or less, 7.0 mass parts or less, 6.0 mass parts or less, 5.0 mass parts or less, 4.0 mass parts or less, 3.0 mass parts or less, 2.0 mass parts or less, or 1.0 mass part or less. For example, 0.05 mass parts or more and yet 10.0 mass parts or less.

Carboxyl group-containing acrylic monomer: 1.0 mass part or more, 2.0 mass parts or more, 3.0 mass parts or more, 4.0 mass parts or more, 5.0 mass parts or more, 6.0 mass parts or more, 7.0 mass parts or more, 8.0 mass parts or more, or 9.0 mass parts or more, and yet 10.0 mass parts or less, 9.0 mass parts or less, 8.0 mass parts or less, 7.0 mass parts or less, 6.0 mass parts or less, 5.0 mass parts or less, 4.0 mass parts or less, 3.0 mass parts or less, or 2.0 mass parts or less. For example, 1.0 mass part or more and yet 10.0 mass parts or less.

Alkyl(meth)acrylate monomer: (100 mass parts)-(total amount of monomers other than alkyl(meth)acrylate monomer that are used for copolymerization)

In the present specification, a "nitrogen-containing (meth) acrylic monomer" includes, without particular limitation, monomers which include a polymerizable functional group having an unsaturated double bond of (meth)acryloyl groups, and which include a nitrogen atom. A "nitrogen-containing (meth)acrylic monomer" has a nitrogen-containing cyclic structure, for example. Examples of nitrogen-containing (meth)acrylic monomers having a nitrogen-containing cyclic structure are N-vinyl-2-pyrrolidone (NVP), N-vinyl-ε-caprolactam (NVC), and 4-acryloyl morpholine (ACMO). These can be used alone or in combination.

In the present specification, a "hydroxyl group-containing acrylic monomer" includes, without particular limitation, monomers which include a polymerizable functional group having an unsaturated double bond of (meth)acryloyl groups, and which include a hydroxyl group. Examples thereof include: hydroxyalkyl(meth)acrylates, such as 2-hydroxybutyl(meth)acrylate, 2-hydroxypropyl(meth)acrylate, 3-hydroxypropyl(meth)acrylate, 4-hydroxybutyl(meth)acrylate, 6-hydroxyhexyl(meth)acrylate, 8-hydroxyoctyl(meth) acrylate, 10-hydroxydecyl(meth)acrylate, and 12-hydroxylauryl(meth)acrylate; 4-hydroxymethylcyclohexyl(meth) acrylate, 4-hydroxybutyl vinyl ether, and the like.

In the present specification, a "carboxyl group-containing acrylic monomer" includes, without particular limitation, monomers which include a polymerizable functional group having an unsaturated double bond of (meth)acryloyl groups or vinyl groups, etc., and which include a carboxyl group. Examples of unsaturated carboxylic acid-containing monomers are (meth)acrylic acid, carboxyethyl(meth)acrylate, carboxypentyl(meth)acrylate, itaconic acid, maleic acid, fumaric acid, crotonic acid, and the like. These can be used alone or in combination.

The adhesive may contain a (meth)acrylic polymer that is a copolymer of a carboxyl group-containing acrylic monomer and at least one other kind of monomer (except for nitrogen-containing (meth)acrylic monomers). In this case, the (meth)acrylic polymer is preferably a copolymer obtained by copolymerizing the following monomers in the following amounts, when the total amount of monomers used for copolymerization is 100 mass parts.

Carboxyl group-containing acrylic monomer: 1.0 mass part or more, 2.0 mass parts or more, 3.0 mass parts or more, 4.0 mass parts or more, 5.0 mass parts or more, 6.0 mass parts or more, 7.0 mass parts or more, 8.0 mass parts or more, or 9.0 mass parts or more, and yet 10.0 mass parts or less, 9.0 mass parts or less, 8.0 mass parts or less, 7.0 mass parts or less, 6.0 mass parts or less, 5.0 mass parts or less, 4.0 mass parts or less, 3.0 mass parts or less, or 2.0 mass parts or less. For example, 1.0 mass part or more and yet 10.0 mass parts or less.

Alkyl(meth)acrylate monomer: 90.0 mass parts or more, 91.0 mass parts or more, 92.0 mass parts or more, 93.0 mass parts or more, 94.0 mass parts or more, 95.0 mass parts or more, 96.0 mass parts or more, 97.0 mass parts or more, or 98.0 mass parts or more, and yet 99.0 mass parts or less, 98.0 mass parts or less, 97.0 mass parts or less, 96.0 mass parts or less, 95.0 mass parts or less, 94.0 mass parts or less, 93.0 mass parts or less, 92.0 mass parts or less, or 91.0 mass parts or less. For example, 90.0 mass parts or more and yet 99.0 mass parts or less.

Cross-linking agents for introducing a cross-linked structure to a (meth)acrylic polymer include cross-linking agents such as isocyanate-based cross-linking agents, epoxy-based cross-linking agents, silicone-based cross-linking agents, oxazoline-based cross-linking agents, aziridine-based cross-linking agents, silane-based cross-linking agents, alkyl-etherated melamine-based cross-linking agents, metal chelate-based cross-linking agents, and peroxides. Each cross-linking agent may be alone or two or more kinds may be used in combination.

An isocyanate-based cross-linking agent is meant to be a compound that includes two or more isocyanate groups (including isocyanate-regenerated functional groups in which the isocyanate group is temporarily protected with a blocking agent or through multimerization, etc.) within one molecule.

Isocyanate-based cross-linking agents include: aromatic isocyanates such as tolylene diisocyanate and xylene diisocyanate; alicyclic isocyanates such as isophorone diisocyanate; aliphatic isocyanates such as hexamethylene diisocyanate; and the like.

More specifically, examples may be: lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylenediisocyanate, and polymethylene polyphenylisocyanate; isocyanate adducts such as trimethylolpropane/tolylene diisocyanate trimer adduct (manufactured by Tosoh Corporation, product name: Coronate L), trimethylolpropane/hexamethylene diisocyanate trimer adduct (manufactured by Tosoh Corporation, product name: Coronate HL), isocyanurate of hexamethylene diisocyanate (manufactured by Tosoh Corporation, product name:

Coronate HX); trimethylolpropane adduct of xylylenediisocyanate (manufactured by Mitsui Chemicals, Inc., product name: D110N), trimethylolpropane adduct of hexamethylene diisocyanate (manufactured by Mitsui Chemicals, Inc., product name: D160N); polyether polyisocyanate, polyester polyisocyanate, and adducts of these with various polyols, polyisocyanates multifunctionalized with isocyanurate bonds, burette bonds, allophanate bonds, or the like, and so on.

Each isocyanate-based cross-linking agent may be used alone, or two or more of them may be used in a mixture. The blended amount of the isocyanate-based cross-linking agent(s) is, with respect to 100 mass parts of a (meth)acrylic polymer, e.g. 0.01 mass parts or more, 0.02 mass parts or more, 0.05 mass parts or more, or 0.1 mass parts or more, and yet 10 mass parts or less, 9 mass parts or less, 8 mass parts or less, 7 mass parts or less, 6 mass parts or less, or 5 mass parts or less, and preferably, 0.01 mass parts or more and yet 10 mass parts or less, 0.02 mass parts or more and yet 9 mass parts or less, or 0.05 mass parts or more and yet 8 mass parts or less. The blended amount may be adjusted appropriately in consideration of cohesion, inhibition of peeling in durability tests, and other factors.

In an aqueous dispersion solution of a modified (meth) acrylic polymer prepared by emulsion polymerization, it is not necessary to use an isocyanate-based cross-linking agent; if necessary, however, a blocked isocyanate-based cross-linking agent can be used because it reacts easily with water.

An epoxy-based cross-linking agent is a multifunctional epoxy compound having two or more epoxy groups within one molecule. Examples of epoxy-based cross-linking agents are: bisphenol A, epichlorohydrin-type epoxy-based resins, ethylene glycidyl ether, N,N,N',N'-tetraglycidyl-m-xylenediamine, diglycidylaniline, diamine glycidylamine, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, glycerin diglycidyl ether, glycerin triglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl)isocyanurate, resorcinol diglycidyl ether, and bisphenol-S-diglycidyl ether, as well as epoxy-based resins having two or more epoxy groups within the molecule, etc. As epoxy-based cross-linking agents, for example, those manufactured by Mitsubishi Gas Chemical Company, Inc., product names: "Tetrad C", "Tetrad X", etc., can be used.

Each epoxy-based cross-linking agent may be used alone, or two or more of them may be used in a mixture. The blended amount of the epoxy-based cross-linking agent(s) is, with respect to 100 mass parts of a (meth)acrylic polymer, e.g. 0.01 mass parts or more, 0.02 mass parts or more, 0.05 mass parts or more, or 0.1 mass parts or more, and yet 10 mass parts or less, 9 mass parts or less, 8 mass parts or less, 7 mass parts or less, 6 mass parts or less, or 5 mass parts or less, and preferably, 0.01 mass parts or more and yet 10 mass parts or less, 0.02 mass parts or more and yet 9 mass parts or less, or 0.05 mass parts or more and yet 8 mass parts or less.

The blended amount may be adjusted appropriately in consideration of cohesion, inhibition of peeling in durability tests, and so on.

As a peroxide cross-linking agent, those which generate radical active species upon heating and promote cross-linking of the base polymer of the tackiness agent can be used as appropriate; in consideration of workability and stability, however, peroxides having a 1 minute half-life temperature of not less than 80° C. and not more than 160° C. are preferably used, and peroxides having a 1 minute half-life temperature of not less than 90° C. and not more than 140° C. are more preferably used.

As the peroxide, for example, di(2-ethylhexyl)peroxydicarbonate (1 minute half-life temperature: 90.6° C.), di(4-t-butylcyclohexyl)peroxydicarbonate (1 minute half-life temperature: 92.1° C.), di-sec-butylperoxydicarbonate (1 minute half-life temperature: 92.4° C.), t-butyl peroxyneodecanoate (1 minute half-life temperature: 103.5° C.), t-hexylperoxypivalate (1 minute half-life temperature: 109.1° C.), t-butylperoxypivalate (1 minute half-life temperature: 110.3° C.), dilauroyl peroxide (1 minute half-life temperature: 116.4° C.), di-n-octanoyl peroxide (1 minute half-life temperature: 117.4° C.), 1,1,3,3-tetramethylbutylperoxy-2-ethylhexanoate (1 minute half-life temperature: 124.3° C.), di(4-methylbenzoyl)peroxide (1 minute half-life temperature: 128.2° C.), dibenzoyl peroxide (1 minute half-life temperature: 130.0° C.), t-butyl peroxyisobutylate (1 minute half-life temperature: 136.1° C.), 1,1-di(t-hexylperoxy) cyclohexane (1 minute half-life temperature: 149.2° C.), and the like. Among others, di(4-t-butylcyclohexyl) peroxydicarbonate (1 minute half-life temperature: 92.1° C.), dilauroyl peroxide (1 minute half-life temperature: 116.4° C.), dibenzoyl peroxide (1 minute half-life temperature: 130.0° C.), and the like are preferably used because of their particularly outstanding cross-linking reaction efficiencies.

The half-life of a peroxide is an index of the decomposition rate of the peroxide, and refers to the time required for the remaining amount of peroxide to be reduced to half. The decomposition temperature for achieving a half-life in a given period of time, and the half-life time at a given temperature, are described in manufacturers' catalogs, for example, "Organic Peroxides Catalog 9th Edition (May 2003)" by Nichiyu Co.

Each peroxide may be used alone, or two or more of them may be used in a mixture. The blended amount of the peroxide is, with respect to 100 mass parts of a (meth)acrylic polymer, 0.02 mass parts or more and yet 2 mass parts or less, and preferably 0.05 mass parts or more and yet 1 mass part or less. It is to be appropriately adjusted within this range for adjusting processibility, reworkability, cross-linking stability, and releasability.

The amount of decomposition of the peroxide remaining after the reaction treatment can be measured by HPLC (high performance liquid chromatography) or other methods, for example.

More specifically, for example, the tackiness agent after the reaction treatment may be taken in about 0.2 g aliquots, immersed in 10 ml of ethyl acetate and extracted by shaking for 3 hours at 120 rpm under 25° C. in a shaking machine, and left at room temperature for 3 days. Then, 10 ml of acetonitrile may be added, and a liquid extract obtained by shaking at 120 rpm for 30 minutes at 25° C. and filtered through a membrane filter (0.45 μm) may be injected in HPLC, and analyzed to determine the amount of peroxide after the reaction treatment.

Organic cross-linking agents and multifunctional metal chelates may also be used as cross-linking agents. A multifunctional metal chelate is a multivalent metal covalently or coordinately bonded to an organic compound. The multivalent metal atoms include Al, Cr, Zr, Co, Cu, Fe, Ni, V, Zn, In, Ca, Mg, Mn, Y, Ce, Sr, Ba, Mo, La, Sn, Ti, and so on. Examples of atoms in the organic compound to which to covalently or coordinately bonded are oxygen atoms; and examples of organic compounds are alkyl esters, alcohol compounds, carboxylic acid compounds, ether compounds, and ketone compounds.

The blended amount of active energy ray-curable resin is e.g. 3 mass parts or more and yet 60 mass parts or less with respect to 100 mass parts of a (meth)acrylic polymer. The weight average molecular weight (Mw) before curing is not less than 4000 and not more than 50000. For example, acrylate-based, epoxy-based, urethane-based, or en-thiol-based UV-curable resins can be suitably used as the active energy ray-curable resin.

As the active energy ray-curable resin, monomers and/or oligomers that undergo radical polymerization or cationic polymerization with active energy rays are used.

Examples of monomers that undergo radical polymerization by active energy rays are monomers having unsaturated double bonds such as (meth)acryloyl groups and vinyl groups, and monomers having (meth)acryloyl groups are especially preferably used due to their good reactivity.

Specific examples of monomers having (meth)acryloyl groups are allyl(meth)acrylate, caprolactone (meth)acrylate, cyclohexyl(meth)acrylate, N,N-diethylaminoethyl(meth) acrylate, 2-ethylhexyl(meth)acrylate, heptadecafluorodecyl (meth)acrylate, glycidyl(meth)acrylate, caprolactone modified 2-hydroxylethyl(meth)acrylate, isobornyl(meth) acrylate, morpholine (meth)acrylate, (meth)acrylate, phenoxy ethyl(meth)acrylate, tripropylene glycol di(meth) acrylate, bisphenol A diglycidyl ether di(meth)acrylate, neopentyl glycol hydroxypivalate di(meth)acrylate, trimethylolpropane tri(meth)acrylate, trimethylolpropane ethoxy tri (meth)acrylate, pentaerythritol tri(meth)acrylate, pentaerythritol tetra(meth)acrylate, dipentaerythritol penta (meth)acrylate, dipentaerythritol hexa(meth)acrylate, caprolactone modified dipentaerythritol hexa(meth)acrylate, and the like.

As oligomers to undergo radical polymerization by active energy rays, polyester (meth)acrylate, epoxy(meth)acrylate, urethane (meth)acrylate, etc., to which two or more unsaturated double bonds, such as (meth)acryloyl groups or vinyl groups, are added as functional groups similar to those of monomers to the polyester, epoxy, urethane, etc. skeleton, are used.

Polyester (meth)acrylate is obtained by allowing a polyester with a terminal hydroxyl group obtained from a polyalcohol and a polycarboxylic acid to react with (meth)

acrylic acid. Specific examples include the Aronix M-6000, 7000, 8000, and 9000 series manufactured by TOAGOSEI CO., LTD.

Epoxy(meth)acrylate is obtained by allowing an epoxy resin to react with (meth)acrylic acid. Specific examples are Ripoxy SP, VR series manufacture by Showa Polymer Co. and Epoxy Ester series manufactured by Kyoeisha Chemical Co.

Urethane (meth)acrylate is obtained by allowing polyol, isocyanate, and hydroxy(meth)acrylate to react. Specific examples are Artresin UN series made by Negami Chemical Industrial Co., Ltd., Shin Nakamura Chemical Co. NK Oligo U series, Shikoh UV series made by Mitsubishi Chemical Corporation, and others.

Through ultraviolet irradiation, a photopolymerization initiator is excited and activated to generate radicals, and acts to cure multifunctional oligomers via radical polymerization. Examples are: acetophenone-based photopolymerization initiators, such as 4-phenoxydichloroacetophenone, 4-t-butyldichloroacetophenone, diethoxyacetophenone, 2-hydroxy-2-methyl-1-phenylpropane-1-one, 1-(4-isopropylphenyl)-2-hydroxy-2-methylpropane-1-one, 1-(4-dodecylphenyl)-2-hydroxy-2-methylpropane-1-one, 4-(2-hydroxyethoxy)phenyl (2-hydroxy-2-propyl)ketone, and 1-hydroxycyclohexylphenyl ketone, 2-methyl-1-[4-(methylthio)phenyl]-2-morpholinopropane-1; benzoin-based photopolymerization initiators, such as benzoin, benzoin methyl ether, benzoin ethyl ether, benzoin isopropyl ether, benzoin isobutyl ether, and 2,2-dimethoxy-2-phenylacetophenone; benzophenone-based photopolymerization initiators, such as benzophenone, benzoyl benzoate, methyl benzoyl benzoate, 4-phenyl benzophenone, hydroxy benzophenone, 4-benzoyl-4'-methyldiphenylsulfide, and 3,3'-dimethyl-4-methoxybenzophenone; thioxanthone-based photopolymerization initiators, such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone; and specialized photopolymerization initiators, such as α-acyloxime esters, acylphosphine oxide, methylphenylglyoxylate, benzyl, camphorquinone, dibenzosuberone, and 2-ethylanthraquinone, 4',4"-diethylisophthalophenone. As the photopolymerization initiator, photocationic polymerization initiators can also be used, such as allylsulfonium hexafluorophosphate salts, sulfonium hexafluorophosphate salts, and bix(alkylphenyl)iodonium hexafluorophosphate.

Two or more of the above photopolymerization initiators can be used in combination. The polymerization initiator is usually blended in the range of 0.5 mass parts or more and yet 30 mass parts or less, and preferably in the range of 1 mass part or more and yet 20 mass parts or less, for 100 mass parts of the above active energy ray-curable resin. If less than 0.5 mass parts, polymerization does not progress sufficiently and the rate of curing may become slow; if more than 30 mass parts, the hardness of the cured sheet may decrease, or other problems may occur.

Active energy rays are not particularly limited, but preferably are ultraviolet, visible light, and electron beams. Cross-linking treatment by UV irradiation can be performed using an appropriate ultraviolet source such as high-pressure mercury lamps, low-pressure mercury lamps, excimer lasers, metal halide lamps, and LED lamps. The ultraviolet irradiation dose can be selected according to the required degree of cross-linking, but usually, in the case of ultraviolet, it is desirably chosen in the range of not less than 0.2 J/cm$^2$ and not more than 10 J/cm$^2$. The temperature during irradiation is not particularly limited, but it is preferably up to about 140° C. in terms of heat resistance of the supporting body.

When the adhesive contains a polyester-based polymer instead of or in addition to a (meth)acrylic polymer, the polyester-based polymer preferably has the following characteristics, for example.

Types of carboxylic acid component (or skeletal features, etc.): containing dicarboxylic acid including at least two carboxyl groups, specifically, dicarboxylic acids, where examples of the dicarboxylic acid are, although not particularly limited, dimer acids which are derived from sebacic acid, oleic acid, erucic acid, or the like. Other examples are glutaric acid, suberic acid, adipic acid, azelaic acid, 1,4-cyclohexane dicarboxylic acid, 4-methyl-1,2-cyclohexane dicarboxylic acid, dodecenyl amberic anhydride, fumaric acid, succinic acid, dodecanedioic acid, hexahydrophthalic anhydride, tetrahydrophthalic anhydride, maleic acid, maleic anhydride, itaconic acid, citraconic acid, or other aliphatic or alicyclic dicarboxylic acids, terephthalic acid, isophthalic acid, orthophthalic acid, 1,5-naphthalene dicarboxylic acid, 2,6-naphthalene dicarboxylic acid, 4,4'-diphenyldicarboxylic acid, 2,2'-diphenyldicarboxylic acid, and 4,4'-diphenyl ether dicarboxylic acid. In addition to the aforementioned dicarboxylic acids, tricarboxylic acids containing three or more carboxyl groups can also be used.

Type of diol component (or skeletal features, etc.): containing those including at least two hydroxyl groups within the molecule, specifically, diols. Dimer diols derived from fatty esters, oleic acid, erucic acid, etc., glycerol monostearate, or the like. Other examples are: aliphatic glycols such as ethylene glycol, and 1,2-propylene glycol; and, among non-aliphatic glycols, ethylene oxide adducts and propylene oxide adducts of bisphenol A, ethylene oxide adducts and propylene oxide adducts of hydrogenated bisphenol A.

As cross-linking agents for introducing a cross-linked structure to a polyester-based polymer, isocyanate-based cross-linking agents, oxazoline-based cross-linking agents, aziridine-based cross-linking agents, silane-based cross-linking agents, alkyl-etherated melamine-based cross-linking agents, and metal chelate-based cross-linking agents can be used. Their blended amount is e.g. 2.0 mass parts or more and yet 10.0 mass parts or less with respect to 100 mass parts of a polyester-based polymer.

Next, with reference to FIGS. 4 to 6, optical stacks 100B and 101B according to another embodiment of the present invention will be described. For component elements having substantially the same functions as those of the above embodiment, the description of the above embodiment applies unless otherwise specified. The optical stack 100B functions as a light distribution control element as described in Patent Document 2, and can be manufactured by roll-to-roll method. The entire disclosure of Patent Document 2 is incorporated herein by reference.

Figure 4:
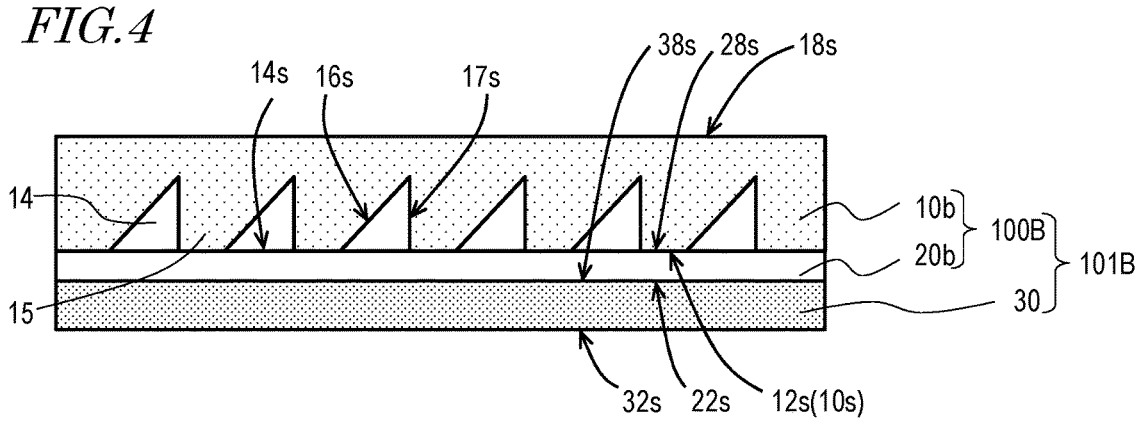
FIG. 4 A schematic cross-sectional view showing an optical stack 100B and an optical stack 101B according to still another embodiment of the present invention.

FIG. 4 shows a schematic cross-sectional view of the optical stacks 100B and 101B, representing a state in which a first optical sheet 10b is adhesively bonded to a surface 38s of a second optical sheet 30 through an adhesive layer 20b. FIG. 5 is a schematic perspective view of the optical sheet 10b of the optical stack 100B. FIG. 6 is a schematic cross-sectional view of an illumination device 200 having an optical stack 102B and a light source 60, and schematically shows the trajectory of light rays.

Figure 5:
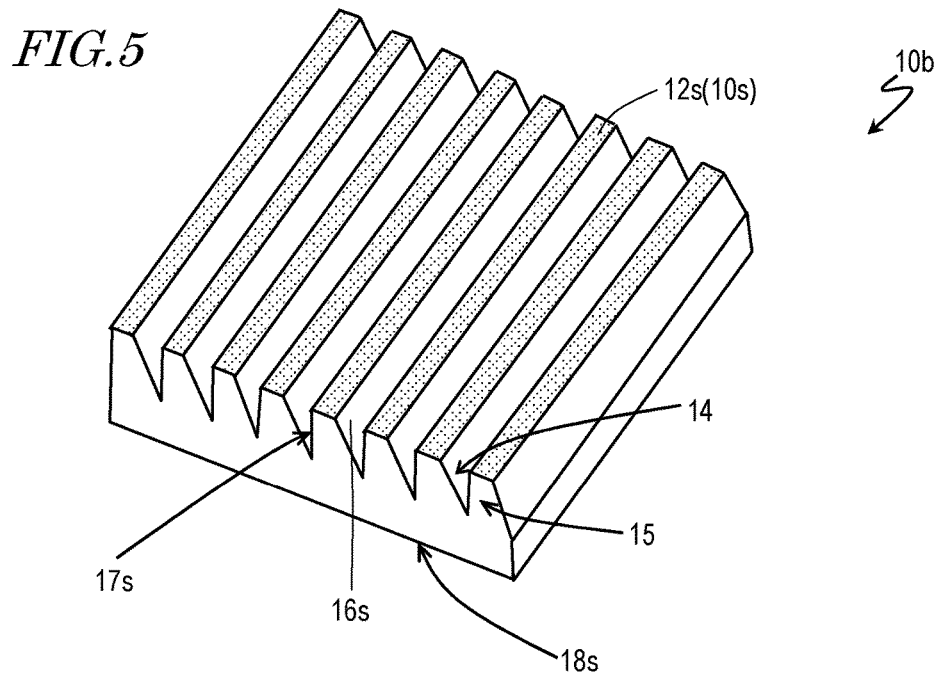
FIG. 5 A schematic perspective view of a first optical sheet 10b included in the optical stack 100B.

See FIG. 4 and FIG. 5. The optical stack 100B includes: a first optical sheet 10b that includes a first principal face 12s having a concavo-convex structure and a second principal face 18s being opposite to the first principal face 12s; and an adhesive layer 20b disposed on the first principal face 12s of the first optical sheet 10b. The optical stack 101B includes: the optical stack 100B; and the second optical sheet 30, which is disposed on an opposite side of the adhesive layer 20a from the first optical sheet 10b. Herein, the concavo-convex structure possessed by the first principal face 12s of the optical sheet 10b includes a plurality of dents 14, such that the surface of the adhesive layer 20b and the first principal face 12s of the optical sheet 10b define a plurality of spaces 14 (indicated by the same reference numeral as the dents) within the plurality of dents 14. The adhesive layer 20b is an essential component element for defining the spaces 14 in the optical stack 100B, and is a part of the optical stack 100B.

The concavo-convex structure possessed by the optical sheet 10b includes flat portions 10s which are in contact with the adhesive layer 20b. The concavo-convex structure includes, for example, a plurality of bumps 15 having a trapezoidal cross-section. Because the concavo-convex structure includes flat portions 10s being in contact with the adhesive layer 20b, the concavo-convex structure of the optical sheet 10b is less likely to allow the adhesive layer 20b to penetrate into the dents than does the concavo-convex structure of the prism surface of the prism sheet 10a shown in FIG. 1. Therefore, by using the aforementioned adhesive, an optical stack 100B can be obtained such that the adhesive layer 20b does not penetrate into the plurality of spaces 14, without change over time.

The optical sheet 10b can be produced by using similar materials to known prism sheets or microlens sheets and by similar methods. The size and shape of the concavo-convex structure of the optical sheet 10b may be changed as necessary (Patent Document 2). However, as mentioned above, the optical sheet 10b differs from known prism sheets or microlens sheets in that it needs to be adhesively bonded to the adhesive layer 20 in order to be able to function as an optical stack 100B in which the spaces 14 are defined.

As shown in FIG. 4, in the optical stack 101B, the second optical sheet 30 is disposed so as to be adhesively bonded at its surface 38s to a surface 22s of the adhesive layer 20b. As the material composing the second optical sheet 30, any suitable material may be adopted depending on the purpose. The material of the second optical sheet 30 may for example be a light-transmitting thermoplastic resin, and more specifically a film made of a (meth)acrylic resin such as polymethyl methacrylate (PMMA), or a polycarbonate (PC)-based resin.

The spaces 14 in the optical stack 100B are defined by the surface 16s and the surface 17s, which are portions of the first principal face 12s of the first optical sheet 10b, and by the surface 28s of the adhesive layer 20b. Although an example is illustrated where the surface 16s is slanted (greater than 0° and less than 90°) with respect to the sheet plane (horizontal direction in the figure) and the surface 17s is essentially perpendicular to the sheet plane, this is not a limitation, and various modification are possible (see Patent Document 2).

Figure 6:
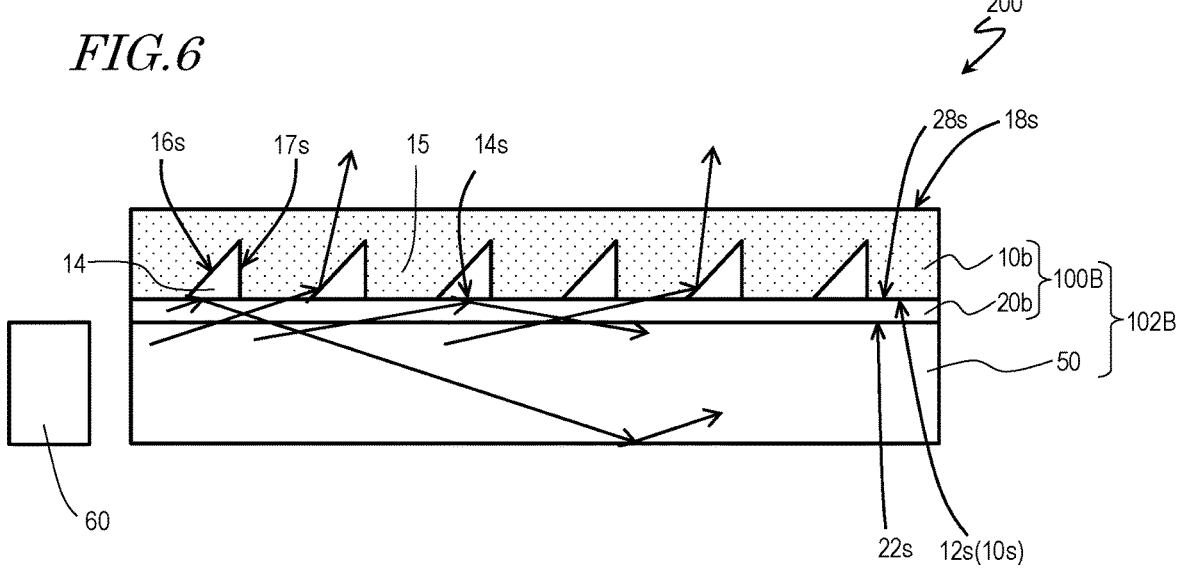
FIG. 6 A schematic cross-sectional view of an illumination device 200 including the optical stack 100B.

The optical stack 100B is used in the illumination device 200, for example, as shown in FIG. 6. On an opposite side of the adhesive layer 20b of the optical stack 100B from the first optical sheet 10b, a light guide plate 50 is provided. The optical stack 100B and the light guide plate 50 are collectively referred to as the optical stack 102B. The optical stack 102B is adhesively bonded to the light guide plate 50 at the surface 22s of the adhesive layer 20b of the optical stack 100B. A light-receiving surface of the light guide plate 50 is arranged so that light from a light source (e.g., an LED) 60 is incident thereon. As indicated by arrows in FIG. 6, rays which are guided into the light guide plate 50 undergo total reflection (TIR) at interfaces 16s and interfaces 14s created by the spaces 14. The rays which are totally reflected at the interfaces 14s (the surface 28s of the adhesive layer 20b) are guided within the light guide plate 50 and the adhesive layer 20b, whereas the rays which are totally reflected at the slopes 16s are emitted to the outside through the surface 18s of the optical stack 100B. By adjusting the shape, size, density of placement, etc., of the spaces 14, the distribution of rays emitted from the optical stack 100B (intensity distribution) can be adjusted. Note that the refractive indices of the light guide plate 50, the adhesive layer 20b, and the optical sheet 10b are preferably equal to one another.

Although FIG. 4 to FIG. 6 illustrate examples where the bumps 15 have a trapezoidal cross-sectional shape, the shape of the bumps 15 is not limited what is illustrated in the figures, and various modifications are possible. By adjusting the shape, size, and the like of the bumps 15, the shape, size, density of placement, and the like of the spaces 14 can be adjusted. For example, International Publication No. 2011/124765 describes an example of a multilayered body having a plurality of internal spaces. The entire disclosure of International Publication No. 2011/124765 is incorporated herein by reference.

Hereinafter, experimental examples (Examples and Comparative Examples) will be described.

Example 1

Preparation of Adhesive Composition Solution

First, an acrylic polymer was prepared. By using a four-necked flask equipped with stirring blades, a thermometer, a nitrogen gas inlet tube, and a condenser, 62.9 mass parts of n-butyl acrylate (BA), 33.9 mass parts of 4-acryloyl morpholine (ACMO), 2.9 mass parts of acrylic acid (AA), 0.3 mass parts of 4-hydroxybutyl acrylate (4HBA), and 0.1 mass parts of 2,2'-azobisisobutyronitrile as a polymerization initiator were placed in the flask together with ethyl acetate, so that the total of monomers was 50 mass %. After nitrogen replacement for 1 hour by introducing nitrogen gas with gentle stirring, the liquid temperature in the flask was kept at around 58° C. and the polymerization reaction was carried out for 8 hours, whereby an acrylic polymer was obtained. After 2 hours had elapsed from the start of the polymerization reaction, ethyl acetate was added dropwise over 3 hours to bring the solid content to 35 mass %. In other words, the acrylic polymer was obtained as an acrylic polymer solution with a solid content of 35 mass %.

Then, in the resultant acrylic polymer solution, with respect to 100 mass parts of the polymer, 7 mass parts in solid content of a UV-curable urethane acrylate resin A (weight average molecular weight Mw: 5,500), 0.7 mass parts of 2,2-dimethoxy-1,2-diphenylethane-1-one (product name: "Omnirad651", manufactured by IGM Japan, Inc.) as a photopolymerization initiator, and 0.1 mass parts of 1,3-bis(N,N-diglycidylaminomethyl)cyclohexane (product name: "TETRAD-C", manufactured by Mitsubishi Gas Chemical Company, Inc.) as a cross-linking agent were blended, thereby preparing an adhesive composition solution.

(Preparation of Adhesive Sheet)

On one side of a polyethylene terephthalate (PET) film (product name: "MRF38", manufactured by Mitsubishi Chemical Corporation) having a thickness of 38 μm and having been silicone release-treated, an adhesive composition solution was applied to form an adhesive composition solution layer. The application was performed so that the adhesive composition solution layer had a thickness after drying (i.e., thickness of the adhesive composition layer) of 1 μm. By drying the adhesive composition solution layer at 150° C. for 3 minutes, the solvent in the adhesive composition solution layer was removed, and the acrylic polymer was cross-linked by the cross-linking agent, whereby an adhesive composition layer having the first cross-linked structure was obtained. Next, the adhesive composition layer was attached onto a release-treated surface of a polyethylene terephthalate (PET) film (product name: "MRE38", manufactured by Mitsubishi Chemical Corporation) having a thickness of 38 μm and having been silicone release-treated, thereby producing an adhesive sheet (first multilayered body) having a layered structure of PET film/adhesive composition layer/PET film.

(Preparation of Optical Stack)

From the resultant adhesive sheet (first multilayered body), one of the release-treated PET films was peeled off, and the exposed adhesive composition layer was attached onto an acrylic resin film (thickness: 20 μm), and the other separator (PET film) was further peeled off. This was attached to the prism surface of a prism sheet having bumps and dents with a pitch P of 10 μm a height H of 5.0 μm, and a vertex angle θ of 90° (see FIG. 1) (manufactured by Nippon Tokushu Kogaku Jushi K. K., product number "LPV90-0.01S"), whereby a multilayered body (second multilayered body) having a layered structure of acrylic resin film/adhesive composition layer/prism sheet was obtained.

Next, this second multilayered body was irradiated with ultraviolet through the upper surface (i.e., the acrylic resin film side) of the second multilayered body to cure the UV-curable resin in the adhesive composition layer, thereby forming an adhesive layer having the second cross-linked structure in addition to the first cross-linked structure. Thus, an optical stack (third multilayered body) of Example 1, having a layered structure of acrylic resin film/adhesive layer/prism sheet (optical sheet), was obtained. As does the optical stack 101A shown in FIG. 2, the optical stack (third multilayered body) of Example 1 includes the first optical sheet (prism sheet) 10a, the adhesive layer 20a, and the second optical sheet (acrylic resin film) 30. Ultraviolet irradiation was performed with an LED lamp (manufactured by Quark Technology Inc., peak illuminance: 200 mW/cm², cumulative light amount: 1500 mJ/cm² (wavelength: 345 to 365 nm)), where the ultraviolet illuminance was measured by using a UV Power Puck (manufactured by Fusion UV Systems Japan, Inc.).

Example 2

Preparation of Adhesive Composition Solution

Example 2 differs from Example 1 in that, in the preparation of the acrylic polymer, n-butyl acrylate, 4-acryloyl morpholine, acrylic acid, and 4-hydroxybutyl acrylate were added in, respectively, 67.8 mass parts/29.0 mass parts/2.9 mass parts/0.3 mass parts. To the resultant acrylic polymer solution, with respect to 100 mass parts in solid content of the polymer, 0.1 mass parts of 1,3-bis(N,N-diglycidylaminomethyl)cyclohexane (product name: "TETRAD-C", manufactured by Mitsubishi Gas Chemical Company, Inc.) was blended as a cross-linking agent, thereby preparing an adhesive composition solution. In other words, the adhesive composition solution of Example 2 contains neither a UV-curable resin nor a photopolymerization initiator.

(Preparation of Adhesive Sheet)

On one side of a polyethylene terephthalate (PET) film (product name: "MRF38", manufactured by Mitsubishi Chemical Corporation) having a thickness of 38 μm and having been silicone release-treated, an adhesive composition solution was applied to form an adhesive composition solution layer. The application was performed so that the adhesive composition solution layer had a thickness after drying (i.e., thickness of the adhesive layer) of 1 μm. By drying the adhesive composition solution layer at 150° C. for 3 minutes, the solvent in the adhesive composition solution layer was removed, and the acrylic polymer was cross-linked by the cross-linking agent, whereby an adhesive layer having a cross-linked structure was obtained.

In Example 1 described above, the adhesive composition solution contains an acrylic polymer, a cross-linking agent, a UV-curable resin, a photopolymerization initiator, and a solvent. In Example 1, by drying the adhesive composition solution layer made from the adhesive composition solution at 150° C. for 3 minutes and cross-linking the acrylic polymer with the cross-linking agent, an adhesive composition layer having the first cross-linked structure is obtained, and thereafter the UV-curable resin in the adhesive composition layer is cured, whereby an adhesive layer having the second cross-linked structure in addition to the first cross-linked structure is formed. On the other hand, in Example 2, the adhesive composition solution contains neither a UV-curable resin nor a photopolymerization initiator. In Example 2, by drying the adhesive composition solution layer made from the adhesive composition solution at 150° C. for 3 minutes and cross-linking the acrylic polymer with the cross-linking agent, an adhesive layer having a cross-linked structure is obtained.

Next, the adhesive layer was attached onto the release-treated surface of a polyethylene terephthalate (PET) film (product name: "MRE38", manufactured by Mitsubishi Chemical Corporation) having a thickness of 38 μm and having been silicone release-treated, thereby producing an adhesive sheet (first multilayered body) having a layered structure of PET film/adhesive layer/PET film.

(Preparation of Optical Stack)

From the resultant adhesive sheet (first multilayered body), one of the release-treated PET films was peeled off, and the exposed adhesive layer was attached onto an acrylic resin film (thickness: 20 μm), and the other separator (PET film) was further peeled off. This was attached to the prism surface of a prism sheet (manufactured by Nippon Tokushu Kogaku Jushi K. K., product number "LPV90-0.01S") having bumps and dents with a pitch of 10 μm, a height of 5.0 μm, whereby an optical stack (second multilayered body) of Example 2 was obtained. As does the optical stack 101A shown in FIG. 2, the optical stack of Example 2 includes the first optical sheet (prism sheet) 10a, the adhesive layer 20a, and the second optical sheet (acrylic resin film) 30.

Example 3

Preparation of Adhesive Composition Solution

In Example 3, in the preparation of the acrylic polymer, by using a four-necked flask equipped with stirring blades, a thermometer, a nitrogen gas inlet tube, and a condenser, 95.0 mass parts of n-butyl acrylate, 5.0 mass parts of acrylic acid, and 0.2 mass parts of 2,2'-azobisisobutyronitrile as a polymerization initiator were placed in the flask together with ethyl acetate, so that the total of monomers was 40.0 mass %. After nitrogen replacement for 1 hour by introducing nitrogen gas with gentle stirring, the liquid temperature in the flask was kept at around 63° C. and the polymerization reaction was carried out for 6 hours. Thereafter, ethyl acetate was added to bring the solid content to 40 mass %, whereby an acrylic polymer was obtained. To the resultant acrylic polymer solution, with respect to 100 mass parts in solid content of the polymer, 6.0 mass parts of 1,3-bis(N,N-diglycidylaminomethyl)cyclohexane (product name: "TET-RAD-C", manufactured by Mitsubishi Gas Chemical Company, Inc.) was blended as a cross-linking agent, thereby preparing an adhesive composition solution.
(Preparation of Adhesive Sheet)
This was performed similarly to Example 2.
(Preparation of Optical Stack)
This was performed similarly to Example 2.

Example 4

Preparation of Adhesive Composition Solution

First, a polyester polymer was prepared. A three-necked separable flask was equipped with an agitator, a thermometer, and a vacuum pump. In this, 48.9 g of a dimer acid (product name: "Pripol 1009", molecular weight 567, manufactured by Croda Japan Co.), 51.1 g of a dimer diol (product name: "Pripol 2033", molecular weight 537, manufactured by Croda Japan Co.), and 0.1 g of dibutyl tin oxide (manufactured by Kanto Chemical Co., Ltd.) as a catalyst were placed. The temperature was raised to 200° C. with stirring in a reduced-pressure ambient (2.0 kPa or less), and this temperature was maintained. The reaction was continued for about 5 hours to obtain a polyester polymer.

To the resultant polyester polymer solution, with respect to 100 mass parts in solid content of the polymer, 4.0 mass parts of an isocyanurate of hexamethylene diisocyanate (product name: "Coronate HX", manufactured by Tosoh Corporation) was blended as a cross-linking agent, thereby preparing an adhesive composition solution.
(Preparation of Adhesive Sheet)
On one side of a polyethylene terephthalate (PET) film (product name: "MRF38", manufactured by Mitsubishi Chemical Corporation) having a thickness of 38 μm and having been silicone release-treated, an adhesive composition solution was applied to form an adhesive composition solution layer. The application was performed so that the adhesive composition solution layer had a thickness after drying (i.e., thickness of the adhesive layer) of 3 μm. By drying the adhesive composition solution layer at 120° C. for 3 minutes, the solvent was removed, whereby an adhesive composition layer was obtained. Next, the adhesive composition layer was attached onto a release-treated surface of a polyethylene terephthalate (PET) film (product name: "MRE38", manufactured by Mitsubishi Chemical Corporation) having a thickness of 38 μm and having been silicone release-treated, and this was left at 40° C. for 3 days, thereby producing an adhesive sheet (first multilayered body) having a layered structure of PET film/adhesive layer/PET film. By treating it at 40° C. for 3 days, the polyester polymer in the adhesive composition layer is cross-linked by the cross-linking agent, whereby an adhesive layer with a cross-linked structure is obtained. The cross-linking reaction may partially occur also in the step of drying at 120° C. for 3 minutes.

(Preparation of Optical Stack)
This was performed similarly to Example 2.

Example 5

Preparation of Adhesive Composition Solution

Example 5 differs from Example 1 in that, in the preparation of the acrylic polymer, n-butyl acrylate, 4-acryloyl morpholine, acrylic acid, and 4-hydroxybutyl acrylate were added in, respectively, 74.6 mass parts/18.6 mass parts/6.5 mass parts/0.3 mass parts. Furthermore, it differs from Example 1 in that, in the preparation of the adhesive composition solution, the following was blended to the resultant acrylic polymer solution, with respect to 100 mass parts of the polymer: 10 mass parts in solid content of a UV-curable urethane acrylate resin A as a UV-curable resin; 1.0 mass part of 4-(2-hydroxyethoxy)phenyl (2-hydroxy-2-propyl)ketone (product name: "Omnirad2959", manufactured by IGM Japan, Inc.) as a photopolymerization initiator; and 0.6 mass parts of 1,3-bis(N,N-diglycidylaminomethyl)cyclohexane (product name: "TETRAD-C", manufactured by Mitsubishi Gas Chemical Company, Inc.) as a cross-linking agent. Otherwise it was performed similarly to Example 1.
(Preparation of Adhesive Sheet)
This was performed similarly to Example 1.
(Preparation of Optical Stack)
This was performed similarly to Example 1.

Example 5a

Figure 7A:
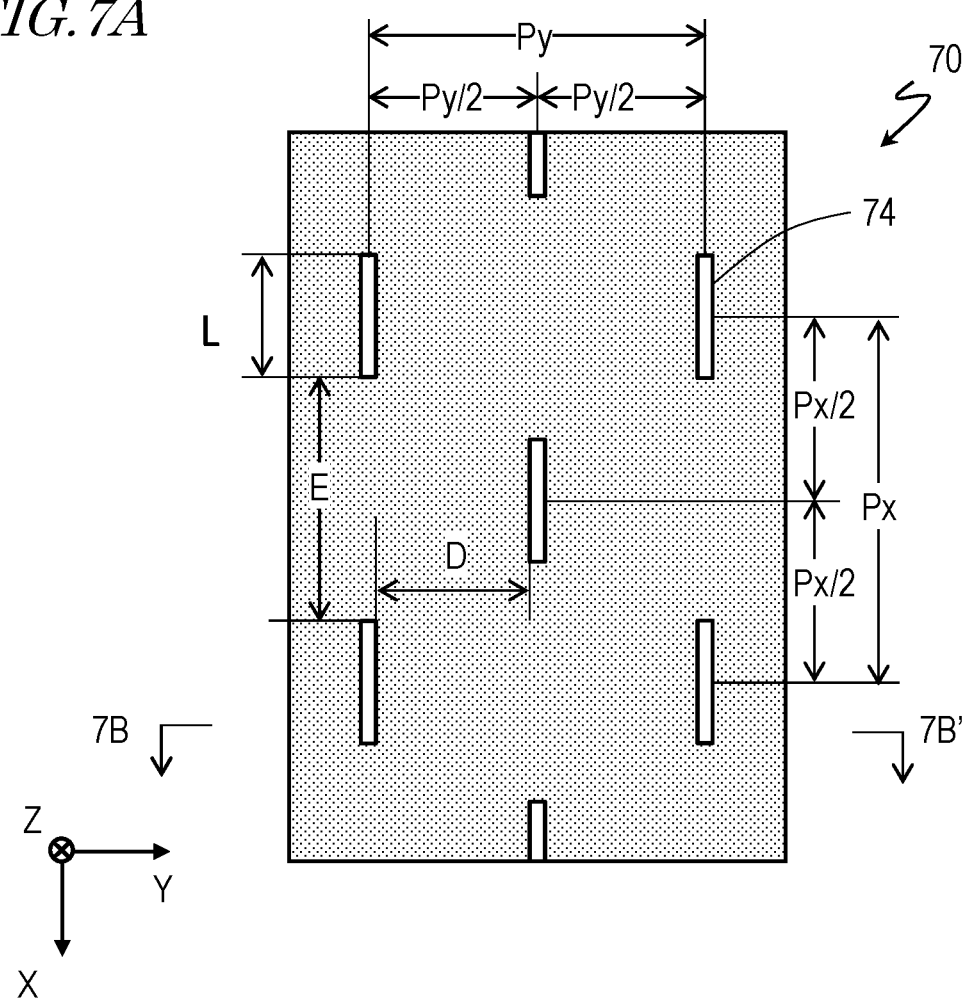
FIG. 7A A schematic plan view of a textured film 70 included in an optical stack according to an embodiment of the present invention.
Figure 7B:
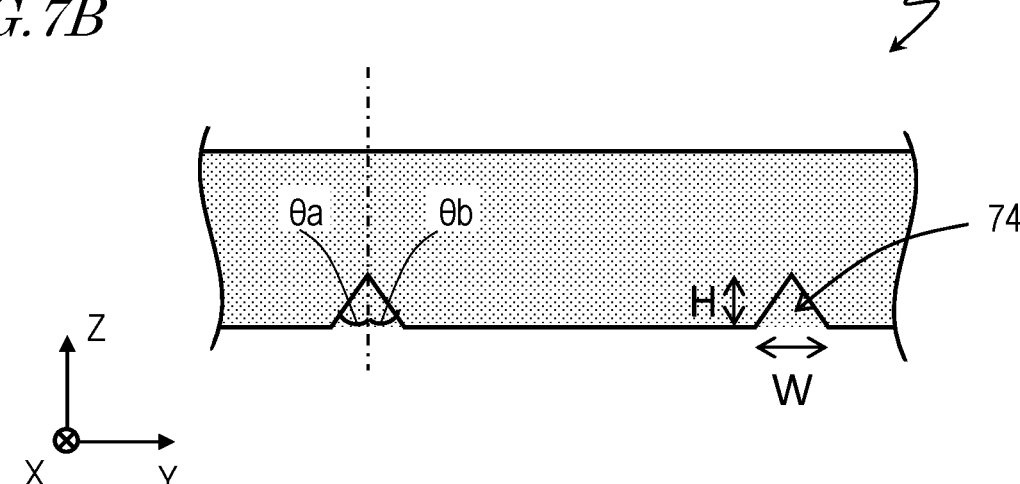
FIG. 7B A schematic cross-sectional view of the textured film 70.

Except for using the following concavo-convex textured film 70 as the optical sheet, an optical stack having a layered structure of acrylic resin film/adhesive layer/optical sheet (concavo-convex textured film) was prepared similarly to Example 5.
(Production of Concavo-Convex Textured Film)
A concavo-convex textured film was produced according to a method described in Japanese National Phase PCT Laid-Open Publication No. 2013-524288. Specifically, the surface of a polymethyl methacrylate (PMMA) film was coated with a lacquer (manufactured by Sanyo Chemical Co., FINECURE RM-64); an optical pattern was embossed on the film surface including the lacquer; and thereafter the lacquer was cured to produce the concavo-convex textured film of interest. The concavo-convex textured film had a total thickness of 130 μm, and a haze of 0.8%. FIG. 7A shows a plan view of a portion of the resultant concavo-convex textured film 70 as viewed from the concavo-convex surface side. FIG. 7B shows a cross-sectional view of the concavo-convex textured film at 7B-7B' in FIG. 7A. A plurality of dents 74 having a length L of 80 μm, a width W of 14 μm, and a depth H of 10 μm and having a triangular cross-section were disposed at intervals of E (155 μm) along the X axis direction. Furthermore, patterns of such dents 74 were disposed at intervals of D (100 μm) along the Y axis direction. The dents 74 had a density of 3612/ cm² on the concavo-convex textured film surface. In FIG. 7B, θa and θb were both 41°, and the dents 74 had a percentage footprint of 4.05% in a plan view of the film as seen from the concavo-convex surface side.

Example 6

Example 6 differs from Example 5 in that, in the preparation of the adhesive sheet (first multilayered body), the adhesive composition solution layer had a thickness after drying (i.e., thickness of the adhesive composition layer) of 5 μm. Otherwise it was performed similarly to Example 5.

Example 6

Except for using the concavo-convex textured film 70 as the optical sheet, an optical stack of Example 6a having a layered structure of acrylic resin film/adhesive layer/optical sheet (concavo-convex textured film) was produced similarly to Example 6.

Example 7

Example 7 differs from Example 5 in that, in the preparation of the adhesive sheet (first multilayered body), the adhesive composition solution layer had a thickness after drying (i.e., thickness of the adhesive composition layer) of 10 μm. Otherwise it was performed similarly to Example 5.

Example 7

Except for using the concavo-convex textured film 70 as the optical sheet, an optical stack of Example 7a having a layered structure of acrylic resin film/adhesive layer/optical sheet (concavo-convex textured film) was produced similarly to Example 7.

Comparative Example 1

Comparative Example 1 differs from Example 2 in that, in the preparation of the acrylic polymer, n-butyl acrylate, 4-acryloyl morpholine, acrylic acid, and 4-hydroxybutyl acrylate were added in, respectively, 77.4 mass parts/19.4 mass parts/2.9 mass parts/0.3 mass parts. Otherwise it was performed similarly to Example 2.

Comparative Example 2

Comparative Example 2 differs from Example 2 in that, in the preparation of the acrylic polymer, n-butyl acrylate, 4-acryloyl morpholine, acrylic acid, and 4-hydroxybutyl acrylate were added in, respectively, 92.0 mass parts/4.8 mass parts/2.9 mass parts/0.3 mass parts. Otherwise it was performed similarly to Example 2.

Evaluations were made as follows for the optical stacks of Examples 1 to 7 and Comparative Examples 1 and 2. Results of evaluation are shown in Table 1.

<Evaluation of Creep Deformation Rate>

Laminates of adhesive layers (thickness 1 mm) were produced as follows.

Examples 1 and 5 to 7: Similarly to the aforementioned adhesive sheet (first multilayered body), but with the adhesive composition layer having a thickness of 10 μm, four adhesive sheets (fifth multilayered body) having a layered structure of PET film/adhesive composition layer (thickness 10 μm)/PET film were produced in a size that was 20 cm wide and 30 cm long. Thereafter, each of the fifth multilayered bodys was irradiated with ultraviolet to cure the UV-curable resin in the adhesive composition layer, whereby an adhesive sheet (sixth multilayered body) having a layered structure of PET film/adhesive layer (thickness 10 μm)/PET film was obtained. By repeating a step of stacking the resultant adhesive sheets (sixth multilayered body) for there being a plurality of adhesive layers and a step of splitting the laminate of adhesive layers into multiple test pieces (i.e., cutting out multiple test pieces), laminates of adhesive layers (thickness 1 mm, sized 4 cm×6 cm) were obtained in which a total of adhesive layers (thickness 10 μm) were stacked. Ultraviolet irradiation for the fifth multilayered body was performed with an LED lamp (manufactured by Quark Technology Inc., peak illuminance: 200 mW/cm², cumulative light amount: 1500 mJ/cm² (wavelength: 345 to 365 nm)), where the ultraviolet illuminance was measured by using a UV Power Puck (manufactured by Fusion UV Systems Japan, Inc.).

Examples 2 to 4 and Comparative Examples 1 and 2: Similarly to the aforementioned adhesive sheet (first multilayered body), but with the adhesive layer having a thickness of 10 μm, four adhesive sheets (sixth multilayered body) having a layered structure of PET film/adhesive layer (thickness 10 μm)/PET film were produced in a size that was 20 cm wide and 30 cm long. By repeating a step of stacking the resultant adhesive sheets (sixth multilayered body) for there being a plurality of adhesive layers and a step of splitting the laminate of adhesive layers into multiple test pieces (i.e., cutting out multiple test pieces), laminates of adhesive layers (thickness 1 mm, sized 4 cm×6 cm) were obtained in which 100 adhesive layers (thickness 10 μm) in total were stacked.

From the laminates of adhesive layers (thickness 1 mm) obtained as above, cylindrical pieces (height 1 mm) with a diameter of 8 mm were punched out, thus producing test pieces. By using a viscoelasticity measurement device (machine name: "ARES G-2", manufactured by T. A. Instruments Japan, Inc.), a 10000 Pa stress was applied to the aforementioned test pieces for 30 minutes, at a measurement temperature of 50° C., and deformation rates after 1 second and after 30 minutes were measured.

In the present specification, a "creep deformation rate" of the adhesive layer is defined as a "creep deformation rate" that is determined for a laminate of adhesive layers (thickness 1 mm) by the above-described method. According to experimentation by the inventors, the creep deformation rate for a 1 mm thickness laminate did not show significant differences between: laminates which were formed by stacking 20 adhesive layers having a thickness of 50 μm, laminates which were formed by stacking 100 adhesive layers having a thickness of 10 μm; and laminates which were formed by stacking 200 adhesive layers having a thickness of 5 μm. In other words, when the thickness of each adhesive layer composing the laminate is in the range of at least 5 μm or more and yet 50 μm or less, the creep deformation rate of a 1 mm thickness laminate does not depend on the thickness of the adhesive layer. According to a study by the inventors, it is considered that the creep deformation rate of a 1 mm thickness laminate has an essentially constant value when the thickness of each adhesive layer is 0.1 μm or more.

<180° Peel Adhesion Strength with Respect to Polymethyl Methacrylate (PMMA)>

For Examples 2 to 4 and Comparative Examples 1 and 2, one of the release-treated PET films was peeled off from the resultant adhesive sheet (first multilayered body), and the exposed surface of the adhesive layer was attached onto a polyethylene terephthalate (PET) film (product name: "Lumirror S-10", manufactured by Toray Industries, Inc.) having a thickness of 25 μm, whereby test pieces were obtained.

Each test piece was cut into 20 mm in width, and the other release-treated PET film was peeled off, and the exposed surface of the adhesive layer was attached onto a polymethyl methacrylate (PMMA) plate (thickness 2 mm, product name: "Acrylite (Shinkolite)", manufactured by Mitsubishi Chemical Corporation). Using this as a test piece, an adhesive strength with respect to a PMMA plate (mN/20 mm) was measured. The pressing when attaching together with a PMMA plate was achieved by moving a 2 kg roller in one back-and-forth travel. After 30 minutes from attaching together, the 180° peel adhesion strength was measured under the following conditions, by using a tensile/compression tester (machine name: "AGS-50NX", manufactured by Shimadzu Corporation).

Peeling rate: 300 mm/minute

Measurement conditions: temperature: 23±2° C., humidity: 65±5% RH

For Examples 1 and 5 to 7, test pieces were produced similarly to Examples 2 to 4 and Comparative Examples 1 and 2 by using an adhesive sheet (first multilayered body), and after attaching them together with a PMMA plate (i.e., after obtaining a multilayered body of PET film (Lumirror S-10)/adhesive composition layer/PMMA plate), ultraviolet irradiation was performed through the PET film, thereby producing the test pieces. Ultraviolet irradiation was performed with an LED lamp (manufactured by Quark Technology Inc., peak illuminance: 200 mW/cm$^2$, cumulative light amount: 1500 mJ/cm$^2$ (wavelength: 345 to 365 nm)), where the ultraviolet illuminance was measured by using a UV Power Puck(manufactured by Fusion UV Systems Japan, Inc.).

<Haze Evaluation>

Laminates of adhesive layers (thickness 80 μm) were produced as follows.

Examples 1 and 5 to 7: By a method similar to that of <evaluation of creep deformation rate>, an adhesive sheet (sixth multilayered body) having a layered structure of PET film/adhesive layer (thickness 10 μm)/PET film was produced in a size that was 20 cm wide and 30 cm long. Eight test pieces were cut out of the resultant adhesive sheet (sixth multilayered body), and a laminate of adhesive layers (thickness 80 μm) was obtained in which 8 adhesive layers (thickness 10 μm) were stacked.

Examples 2 to 4 and Comparative Examples 1 and 2: By a method similar to that of <evaluation of creep deformation rate>, an adhesive sheet (sixth multilayered body) having a layered structure of PET film/adhesive layer (thickness 10 μm)/PET film was produced in a size that was 20 cm wide and 30 cm long. Eight test pieces were cut out of the resultant adhesive sheet (sixth multilayered body), and a laminate of adhesive layers (thickness 80 μm) was obtained in which 8 adhesive layers (thickness 10 μm) were stacked.

By attaching the laminate of adhesive layers (thickness 80 μm) to a silicone release-treated PET film, a multilayered body having a layered structure of PET film/laminate of adhesive layers (thickness 80 μm)/PET film was obtained. From the multilayered body having a layered structure of PET film/laminate of adhesive layers (thickness 80 μm)/PET film, one of the separators (PET film) was peeled off, and the laminate of adhesive layers was attached onto a glass plate (product name: "EAGLE XG", manufactured by Corning Inc., thickness: 0.7 mm), and the other separator was further peeled off, whereby a test piece having a layered structure of laminate of adhesive layers/glass plate was produced. The haze of the test piece was measured by using a haze meter (machine name: "HZ-1", manufactured by Suga Testing Machinery Co.), with D65 light.

In the present specification, the "haze" of an adhesive layer is defined as a "haze" that is determined for a laminate of adhesive layers (thickness 80 μm) by the above-described method. The haze of a 80 μm thick laminate does not depend on the thickness of each adhesive layer composing the laminate.

<Evaluation of Diffuse Transmittance>

The optical stack of each Example or Comparative Example was set in a haze meter (machine name: "HZ-1", manufactured by Suga Testing Machinery Co.) so that the acrylic resin film faced the light source, and its diffuse transmittance was measured with D65 light. A diffuse transmittance immediately after attachment (within 5 minutes) (indicated as "diffuse transmittance (immediately after)" in Table 1) and a diffuse transmittance 10 days after attachment (stored at temperature: 23±2° C., humidity: 65±5% RH) (indicated as "diffuse transmittance (10 days after)" in Table 1) were measured. The resultant diffuse transmittance was judged by the following criteria.

Diffuse transmittance immediately after attachment (within 5 minutes)

⊚: 96% or more
○: 95% or more but less than 96%
Δ: 94% or more but less than 95%
x: Less than 94% diffuse transmittance 10 days after attachment

⊚: 90% or more
○: 85% or more but less than 90%
Δ: 84% or more but less than 85%
x: Less than 84%

TABLE 1

| | acrylic polymer or polyester polymer | UV-curable resin | creep deformation rate (after 1 second)[%] | creep deformation rate (after 30 minutes)[%] | adhesive strength to PMMA [mN/ 20 mm] | haze [%] | thickness of adhesive layer [μm] | diffuse transmittance (immediately after)[%] | | diffuse transmittance (10 days after) [%] | |
|---|---|---|---|---|---|---|---|---|---|---|---|
| | | | | | | | | | judgement | | judgement |
| Example 1 | BA/ACMO/AA/4HBA = 62.9/33.9/2.9/0.3 | YES | 3.9 | 13.4 | 70 | 1.3 | 1 | 97.0 | ⊚ | 93.9 | ⊚ |
| Example 2 | BA/ACMO/AA/4HBA = 67.8/29.0/2.9/0.3 | NO | 7.6 | 15.9 | 90 | 0.7 | 1 | 95.1 | ○ | 88.4 | ○ |
| Example 3 | BA/AA = 95/5 | NO | 9.3 | 9.3 | 220 | 0.7 | 1 | 95.0 | ○ | 93.7 | ⊚ |
| Example 4 | polyester | NO | 2.8 | 3.1 | 210 | 0.9 | 3 | 96.0 | ⊚ | 94.1 | ⊚ |
| Example 5 | BA/ACMO/AA/4HBA = 74.6/18.6/6.5/0.3 | YES | 4.4 | 5.6 | 385 | 0.7 | 1 | 96.8 | ⊚ | 95.5 | ⊚ |
| Example 6 | | YES | 3.8 | 5.7 | 931 | 0.7 | 5 | 95.3 | ○ | 90.8 | ⊚ |
| Example 7 | | YES | 3.8 | 5.7 | 989 | 0.7 | 10 | 95.3 | ○ | 90.0 | ⊚ |
| Comparative Example 1 | BA/ACMO/AA/4HBA = 77.4/19.4/2.9/0.3 | NO | 9.9 | 16.5 | 330 | 0.5 | 1 | 94.0 | Δ | 84.8 | Δ |
| Comparative Example 2 | BA/ACMO/AA/4HBA = 92.0/4.8/2.9/0.3 | NO | 11.0 | 15.0 | 450 | 0.6 | 1 | 90.3 | X | 83.3 | X |

The optical stacks of Examples 1 to 7 all have a diffuse transmittance immediately after attachment (within 5 minutes) of 95% or more and a diffuse transmittance 10 days after attachment of 85% or more. On the other hand, the optical stacks of Comparative Examples 1 and 2 have a diffuse transmittance immediately after attachment (within 5 minutes) of less than 95%, and a diffuse transmittance 10 days after attachment of less than 85%. From these results, it can be said that, in the adhesive layers in Examples 1 to 7, penetration of the adhesive layer into the dents of the optical sheet when attaching the adhesive layer onto the optical sheet and change over time in the degree of penetration of the adhesive layer into the dents are suppressed.

For the optical stacks of Examples 5a, 6a and 7a in which a concavo-convex textured film having a plurality of dents in its surface was used as the optical sheet, and 10 days after attaching the optical sheet and the adhesive composition layer together, a cross-section (a cross-section containing a cross-section of the concavo-convex textured film 70 in FIG. 7B) of the optical stacks of Examples 5a, 6a and 7a was observed with an optical microscope (manufactured by NIKON SOLUTIONS CO., LTD., ECLIPSE LV100) at a magnification of 1500×. For any of Examples 5a, 6a and 7a, it was confirmed from the observe image that there was substantially no penetration of the adhesive layer into the dents 74 of the concavo-convex textured film 70, and that change over time in the degree of penetration of the adhesive layer into the dents had been suppressed.

The adhesive layer of any of the optical stacks of Examples 1 to 7 had a creep deformation rate after 1 second (creep deformation rate A) of 10% or less and a creep deformation rate after 30 minutes (creep deformation rate B) of 16% or less. On the other hand, the adhesive layers of the optical stacks of Comparative Examples 1 and 2 had a creep deformation rate A of greater than 10% and/or a creep deformation rate B of greater than 16%. It can be said that the creep deformation rate of the adhesive layer has a certain correlation with the diffuse transmittance of the optical stack. It can be seen from the results of the Examples 1 to 7 that, from the standpoints of suppressing penetration of the adhesive layer into the dents of the optical sheet when attaching the adhesive layer onto the optical sheet and suppressing change over time in the degree of penetration of the adhesive layer into the dents, the adhesive layer preferably has a creep deformation rate after 1 second (creep deformation rate A) of 10% or less and a creep deformation rate after 30 minutes (creep deformation rate B) of 16% or less.

Example 2, Comparative Examples 1 and 2 only differ in terms of the mass ratio between n-butyl acrylate (BA) and 4-acryloyl morpholine (ACMO) in the preparation of the (meth)acrylic polymer. In Example 2, BA:ACMO=70:30; in Comparative Example 1, BA:ACMO=80:20; in Comparative Example 2, BA:ACMO=95:5. The ratio of the ACMO-derived component to the entire adhesive is 29.0 mass % in Example 2, 19.4 mass % in Comparative Example 1, and 4.8 mass % in Comparative Example 2. However, without being limited to this example, the (meth)acrylic polymer may be prepared without using a nitrogen-containing (meth)acrylic monomer, as can be seen from Example 3, for example. The adhesives in Examples 1 and 5 to 7 further contain a cured material of the UV-curable resin, in addition to the nitrogen-containing (meth)acrylic monomer-derived component having a nitrogen-containing cyclic structure (Example 1: 31.4 mass % with respect to the entire adhesive, Examples 5 to 7: 16.7 mass % with respect to the entire adhesive). In the case where a cured material of the UV-curable resin is further contained, a preferable ratio of the nitrogen-containing (meth)acrylic monomer having a nitrogen-containing cyclic structure may change. It can also be seen that, as in Example 4, an adhesive containing a polyester-based polymer instead of a (meth)acrylic polymer may also be used.

INDUSTRIAL APPLICABILITY

Optical stacks according to the present invention can be broadly used in optical devices, such as display devices or illumination devices.

REFERENCE SIGNS LIST

10a, 10b first optical sheet
12s, 18s principal face (surface)
20a, 20b adhesive layer
30 second optical sheet
32s, 38s principal face (surface)
50 light guide plate
60 light source
100A, 100B, 101A, 101B, 102B optical stack
200 illumination device

The invention claimed is:

1. An adhesive layer having a creep deformation rate of 10% or less when a stress of 10000 Pa is applied at 50° C. for 1 second, and a creep deformation rate of 16% or less when a stress of 10000 Pa is applied at 50° C. for 30 minutes, in a creep test using a rotational rheometer, and having a 180° peel adhesive strength of 10 mN/20 mm or more with respect to a polymethyl methacrylate (PMMA) film; wherein the adhesive layer comprises a (meth)acrylic polymer, and at least one of polymers (1) to (3):

(1) a copolymer of a nitrogen-containing (meth)acrylic monomer and at least one other monomer, (2) a copolymer of a carboxyl group-containing acrylic monomer and at least one other monomer except for nitrogen-containing (meth)acrylic monomers, and (3) a polyester-based polymer, the (meth)acrylic polymer is a copolymer of an alkyl (meth)acrylate having an alkyl group with 4 to 9 carbon atoms and at least one other monomer, and a ratio of the alkyl (meth)acrylate to a total amount of monomer used in production of the (meth)acrylic polymer of the adhesive layer is 50 mass % or more.

2. The adhesive layer of claim 1, having a haze of from 0.01% to 5%.

3. The adhesive layer of claim 1, having a thickness of from 0.1 μm to 20 μm.

4. The adhesive layer of claim 1, comprising the polyester-based polymer.

5. The adhesive layer of claim 1, wherein the copolymer of a nitrogen-containing (meth)acrylic monomer and at least one other monomer is included in the adhesive layer.

6. The adhesive layer of claim 5, wherein the nitrogen-containing (meth)acrylic monomer has a nitrogen-containing cyclic structure.

7. The adhesive layer of claim 5, wherein the copolymer of the nitrogen-containing (meth)acrylic monomer and the at least one other monomer is cross-linked.

8. The adhesive layer of claim 5, not comprising a graft polymer.

9. The adhesive layer of claim 5, further comprising a cured material of an active energy ray-curable resin.

10. The adhesive layer of claim 9, formed by curing the active energy ray-curable resin in an adhesive composition layer comprising the (meth)acrylic polymer, the copolymer of the nitrogen-containing (meth)acrylic monomer and the at least one other monomer, the active energy ray-curable resin, and a polymerization initiator.

11. A multilayered body comprising:

the adhesive layer of claim 1; and a substrate having a release-treated principal face, wherein the release-treated principal face of the substrate is attached onto the adhesive layer.

12. A multilayered body comprising:

the adhesive composition layer from which to form the adhesive layer of claim 10; and a substrate having a release-treated principal face, wherein the release-treated principal face of the substrate is attached onto the adhesive composition layer.

13. An optical stack comprising:

a first optical sheet that includes a first principal face having a concavo-convex structure and a second principal face being opposite to the first principal face; and the adhesive layer of claim 10 disposed on the first principal face of the first optical sheet.

14. The optical stack of claim 13, wherein the concavo-convex structure includes a plurality of dents, and a surface of the adhesive layer and the first principal face of the first optical sheet define a plurality of spaces within the plurality of dents.

15. The optical stack of claim 14, wherein the concavo-convex structure includes a flat portion that is in contact with the adhesive layer.

16. A production method for the optical stack of claim 13, the production method comprising: attaching the first optical sheet and the adhesive layer together.

17. The production method of claim 16, wherein the first optical sheet and the adhesive layer are attached together by roll-to-roll method.

18. The optical stack of claim 13, further comprising a second optical sheet disposed on an opposite side of the adhesive layer from the first optical sheet.

19. A production method for the optical stack of claim 18, the production method comprising either:

A1: attaching the second optical sheet to a first multilayered body in which the first optical sheet and the adhesive layer are stacked; or A2: attaching the first optical sheet to a second multilayered body in which the adhesive layer and the second optical sheet are stacked.

20. The production method of claim 19, wherein either:

the production method comprises A1 in which the first multilayered body and the second optical sheet are attached together by roll-to-roll method; or the production method comprises A2 in which the second multilayered body and the first optical sheet are attached together by roll-to-roll method.

21. An optical device comprising the optical stack of claim 13.

22. A production method for the optical stack of claim 13, the production method comprising:

applying the adhesive composition layer onto the first principal face of the first optical sheet; and with the adhesive composition layer being applied on the first principal face of the first optical sheet, curing the active energy ray-curable resin in the adhesive composition layer.

23. The production method of claim 22, wherein the application of the adhesive composition layer onto the first principal face of the first optical sheet comprises attaching together the first optical sheet and the adhesive composition layer by roll-to-roll method.

24. A production method for the optical stack of claim 18, the production method comprising either:

A1: attaching the second optical sheet to a first multilayered body in which the first optical sheet and the adhesive composition layer are stacked, and thereafter curing the active energy-ray curable resin comprised in the adhesive composition layer; or A2: attaching the first optical sheet to a second multilayered body in which the adhesive composition layer and the second optical sheet are stacked, and thereafter curing the active energy-ray curable resin comprised in the adhesive composition layer.

25. The production method of claim 24, wherein either:

the production method comprises A1 in which the first multilayered body and the second optical sheet are attached together by roll-to-roll method; or the production method comprises A2 in which the second multilayered body and the first optical sheet are attached together by roll-to-roll method.

26. An optical stack comprising:

a first optical sheet that includes a first principal face having a concavo-convex structure and a second principal face being opposite to the first principal face; and the adhesive layer of claim 1 disposed on the first principal face of the first optical sheet.

* * * * *